(12) United States Patent
Pan et al.

(10) Patent No.: US 8,940,346 B1
(45) Date of Patent: Jan. 27, 2015

(54) INFRARED BASED PEELING OF FRUITS AND VEGETABLES

(75) Inventors: Zhongli Pan, Davis, CA (US); Tara H. McHugh, Albany, CA (US); James B. Valenti-Jordan, Walnut Creek, CA (US); Carlos H. Masareje, Woodland, CA (US)

(73) Assignees: The United States of America as represented by the Secretary of Agriculture, Washington, DC (US); Del Monte Foods, Inc., San Francisco, CA (US)

( * ) Notice: Subject to any disclaimer, the term of this patent is extended or adjusted under 35 U.S.C. 154(b) by 150 days.

(21) Appl. No.: 13/110,824

(22) Filed: May 18, 2011

Related U.S. Application Data

(60) Provisional application No. 61/418,859, filed on Dec. 1, 2010.

(51) Int. Cl.
*A23N 7/02* (2006.01)

(52) U.S. Cl.
USPC ............ 426/241; 426/237; 426/479; 426/481

(58) Field of Classification Search
USPC .......... 426/241, 244, 467, 479, 481–483, 237
See application file for complete search history.

(56) References Cited

U.S. PATENT DOCUMENTS

| | | | | |
|---|---|---|---|---|
| 2,979,097 | A * | 4/1961 | Rogers et al. | 99/470 |
| 3,618,651 | A * | 11/1971 | Hart et al. | 426/287 |
| 3,982,037 | A * | 9/1976 | Weaver et al. | 426/482 |
| 5,020,237 | A | 6/1991 | Gross et al. | |
| 5,342,640 | A * | 8/1994 | Roussel et al. | 426/479 |
| 5,545,422 | A * | 8/1996 | Davies et al. | 426/482 |
| 6,294,769 | B1 * | 9/2001 | McCarter | 219/544 |
| 7,202,447 | B2 * | 4/2007 | Kingdon et al. | 219/388 |

OTHER PUBLICATIONS

Pan, Z. et al., "Development of Infrared Radiation Heating Method for Sustainable Tomato Peeling" (2009) Applied Engineering in Agriculture 25(6)1-7.
Li, X. et al., "Feasibility Study of Using Infrared Radiation Heating as a Sustainable Tomato Peeling Method" (2009) ASABE Meeting Presentation—Paper No. 095689.

* cited by examiner

*Primary Examiner* — Steven Leff
(74) *Attorney, Agent, or Firm* — John Fado; Robert D. Jones; Lesley Shaw

(57) ABSTRACT

A method and apparatus for infrared peeling of fruits and vegetables is disclosed herein.

7 Claims, 28 Drawing Sheets

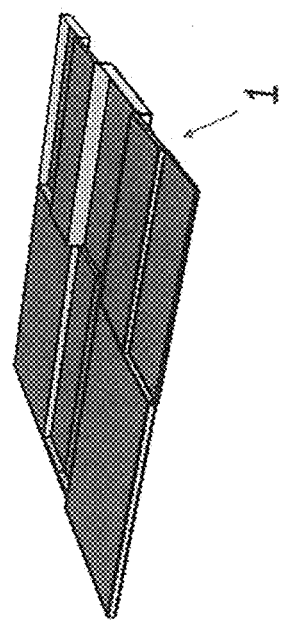
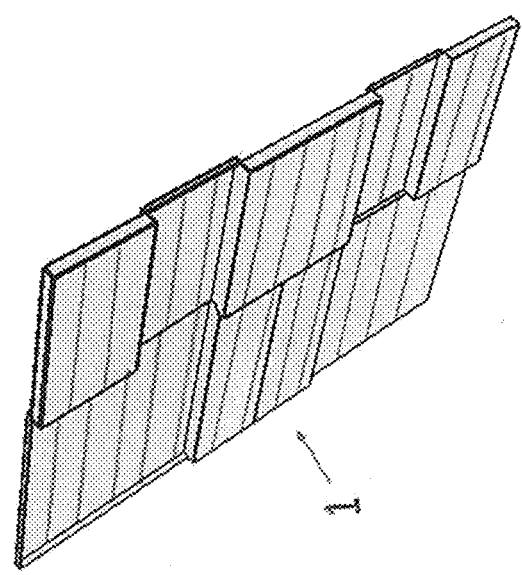
FIG. 27 B
FIG. 27 A

INFRARED BASED PEELING OF FRUITS AND VEGETABLES

This application claims priority to U.S. Provisional Patent Application Ser. No. 61/418,859, filed Dec. 1, 2010 which is herein incorporated by reference in its entirety.

FIELD OF THE INVENTION

The present invention relates to an infra-red method and apparatus for removal of peel from fruits and vegetables without the use of chemicals or steam. Unique final product microstructure is achieved through this process, resulting in improved final product quality.

BACKGROUND OF THE INVENTION

Lye peeling is traditionally used in fruit and vegetable processing industry due to its ability to produce high quality products. However, the process yields large amount of wastewater with high salinity which has a negative impact on the environment (Garcia and Barrett, 2006a, b; Masanet et al., 2007; Schlimme et al., 1984; Wongsa-Ngasri, 2004). The alternative process of steam peeling results in deteriorated product quality factors including appearance, higher loss in firmness, and lower yield compared to the regular lye peeling method (Garcia and Barrett, 2006a). Furthermore, the process of mechanical peeling by knife cutting suffers from reduced final product yield.

Alternative peeling techniques such as enzymatic peeling, flame-peeling, vacuum-peeling, acid-peeling, freeze-peeling, calcium chloride peeling, and peeling with ohmic heating have been studied on different fruits and vegetables (Rouhana and Mannheim, 1994; (Ben-Shalom and Pinto, 1986; Pretel et al., 1997; Toker and Bayndrl, 2003). Other researchers have also studied modified conventional methods, such as high pressure steam peeling with flash cooling, lye-steam peeling, dry-caustic peeling, and freeze-heat peeling (Smith et al., 1980). However, successful commercialization of these methods has been hampered because of high equipment and processing costs or other reasons such as reduced final product quality.

Infrared (IR) radiation is energy in the electromagnetic wave form that can be used for thermal processing of foodstuff (Pan et al., 2008). Our investigations have recently demonstrated the potential of using IR as an alternative and sustainable tomato peeling technology (Li et al., 2009). Tomato peel loosening involves the loss of rigidity and separation of several cell layers between exocarp and mesocarp due to the breakdown of pectin and the formation of cracks on the tomato surface because of the reduced skin strength. During IR peeling, thermal effects are thought to control the release of the skin although the exact mechanism is unknown. This is mechanistically contrary to the traditional lye peeling whereby the lye solution penetrates the skin and dissolves the pectic and hemicellulosic material in the cell walls via diffusion and removes the pectin which results in the weakening of the network of cell wall and causes the release of the skin (Das and Barringer, 2005). The mechanism for steam peeling is similar to lye peeling, but without dissolving related to the lye. Resulting loss of tissue from steam peeling is typically high as is loss of firmness in the final product, making it less desirable than lye peeling. IR peeling is also different from knife cutting which typically removes a relatively thick layer of tissue rather than just the skin of fruits and vegetables. The novel IR peeling method and use of apparatus in this invention result in products with surprisingly good quality, high yields, as well as excellent color, texture and flavor.

Although prior studies have investigated the potential of IR for peeling, none have been successful without the use of some caustic/lye in addition to application of IR. This invention for the first time claims the use of IR alone as a highly effective method for peeling fruits and vegetables. Previous studies on IR dry caustic peeling proposed that since IR does not require a heating medium for the delivery of energy to the product, such as water, that the process be named "dry peeling" (Hart et al., 1970). The application of IR dry-caustic peeling was studied for white potatoes and peaches and the results exhibited significant decreases in peeling loss, usage of caustic lye and generation of wastewater (Sproul et al., 1975). These examples used both IR and caustic and differ from the claimed invention in that the claimed invention for the first time uses only IR for peeling purposes.

Because of the high heat delivery capability and low penetration depth, IR is a very suitable heating method for efficiently loosening the skin and thereby peeling of fruits and vegetables. Uniform rapid heating of the fruits and vegetables during IR treatment was not previously achieved and is necessary to produce good quality end products. This invention solves these and other previously insurmountable challenges related to IR peeling and enables the user for the first time to take advantage of the IR process to efficiently peel fruits and vegetables commercially.

SUMMARY OF THE INVENTION

An embodiment of the invention is a product with a microstructure containing a ratio of cell wall expansion within the interior of the product that is not observed through other peeling processes.

An embodiment of the invention is an apparatus containing concave infra-red emitters with the appropriate composition, wavelength, intensity, configuration and temperature encased in a heat reflective metal housing with or without air circulation controls to provide uniform heating to the surfaces of fruits and vegetables in order to promote peeling.

A further embodiment of said apparatus is the use of rotation of the fruit or vegetable upon exposure to the emitters and/or use of conveyors and belts adapted to the shape of the fruit or vegetable to provide maximum and uniform exposure to the heat from the emitters.

Another embodiment is of the apparatus is a reflective metal housing that maximizes heat transfer and containment in the apparatus for optimum peeling.

A further embodiment is the inclusion of air circulation in the IR apparatus to promote uniform high quality products.

Another embodiment is the use of vacuum during IR treatment to assist peeling of fruits and vegetables.

An additional embodiment is a method of dry peeling fruits and vegetables without the use of chemicals or steam by exposing the fruit and vegetables to the apparatus' embodied above with the appropriate composition, wavelength, intensity, configuration and temperature for a time sufficient to promote peeling.

Another embodiment is the use of surfactant mixtures and or to assist in infrared peelingSurface active agents or surfactants are multi-functional chemical entities. Ionic (anionics, cationics and amphoterics) and Non-ionic surfactants are most commonly used. Non-ionic surfactants commonly include mono- and di-glycerides, derivatives such as acetylated, succinylated and diacetylated tartaric esters of distilled monoglycerides, lactylated esters, sorbitan esters, polysorbates, propylene glycol esters, sucrose esters and polyglycerol esters. One specific example is ethyl oleate or oleic acid ethyl ester.

Another embodiment is the use of vacuum chamber after IR heating to promote the separation of the peels and flesh.

Another embodiment is the use of scrubbers such as discs or abrasives to assist in removal of the peel from the infrared treated fruit or vegetables.

BRIEF DESCRIPTION OF THE DRAWINGS

FIG. 27 is a drawing of an alternate array emitter configuration, bottom and top view.

DESCRIPTION OF THE INVENTION

The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

"Fruit and vegetables" as defined herein is inclusive of but not limited to skin containing produce, such as pear, peach, apricot, apple, grape, cherries, tomato, bananas, potato, eggplant, tomato, cucumber, zucchini, oranges, lemons, grapefruit.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement.

Figure 1:
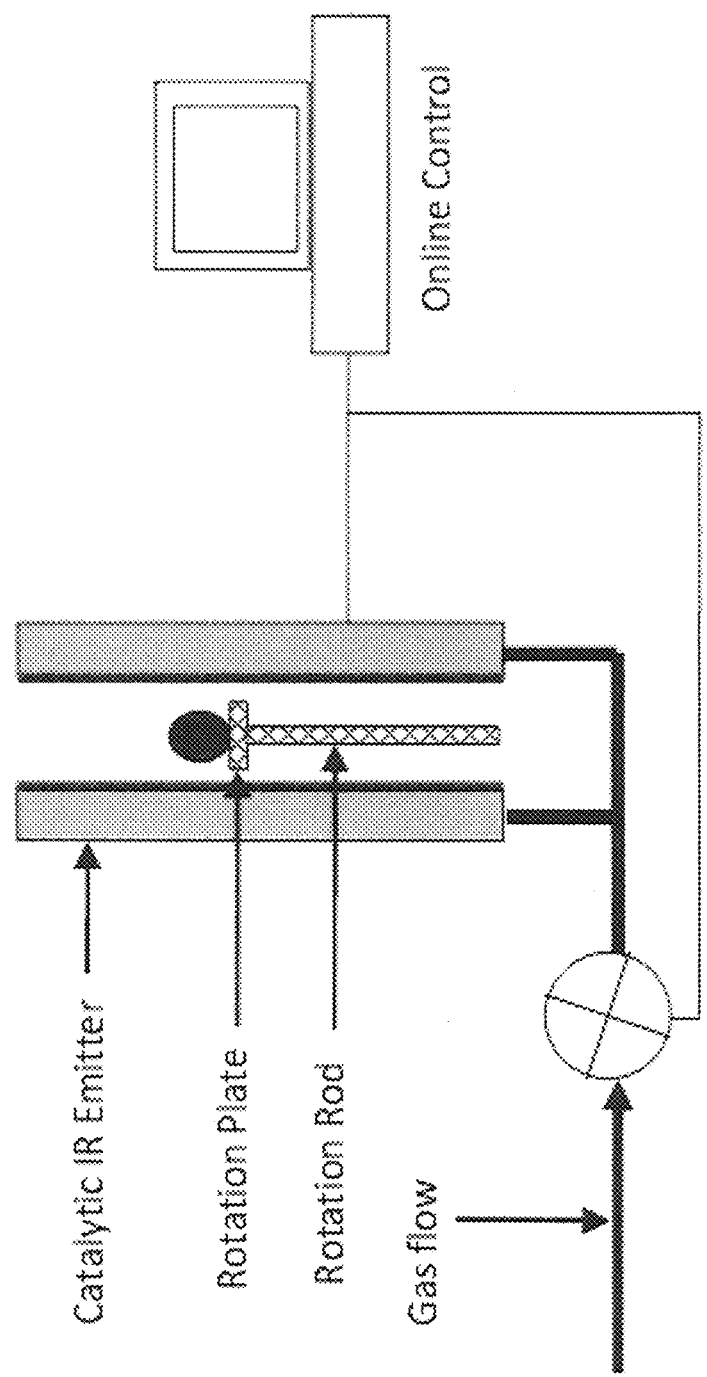
FIG. 1 is a drawing of a catalytic IR emitter with rotating produce.
Figure 2:
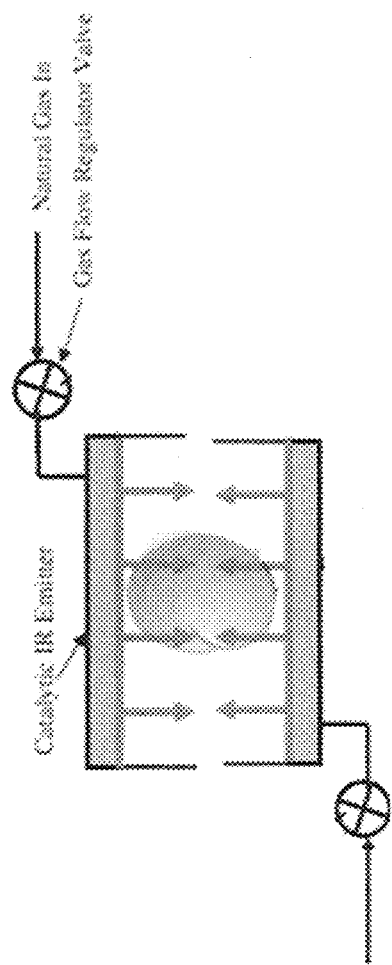
FIG. 2 is a drawing of an IR heating for peach peeling.

An embodiment of the apparatus employs a delivery belt or conveyor to transport the fruit and vegetables to a space between two infra-red emitters or lateral exposure to one IR emitter. Optionally, the fruit or vegetable may be supported for rotation within the emitter heat field (FIG. 1). The emitters are non glass and may be catalytic, ceramic depending on the targeted fruit or vegetable. The orientation of the emitter with respect to the fruit or vegetable may be horizontal (FIG. 2), vertical or multidirectional. The selection of emitters is based on the properties of the particular fruit or vegetable. The surface of the emitters may be flat or as a preferred embodiment possess a concave surface wherein the relative degree of curvature of the emitter is shaped in relation to the targeted fruit or vegetable to maximize heat uniformity to the surface of the peel. The degree of curvature of the emitter may be from 1° to 180° depending on the area and shape of the fruit or vegetable within the emitter heat field. An additional embodiment for achieving uniformity is by configuring emitters in an array or zigzag(z) pattern. Referring to FIGS. 27 A & B, an array pattern consists of multi-sectional contiguously attached emitters wherein the total emission area 1 of the array is flat or concave in shape and the emitters in each section are offset relative to the other attached section(s) in depth, lateral orientation or both.

Figure 28:
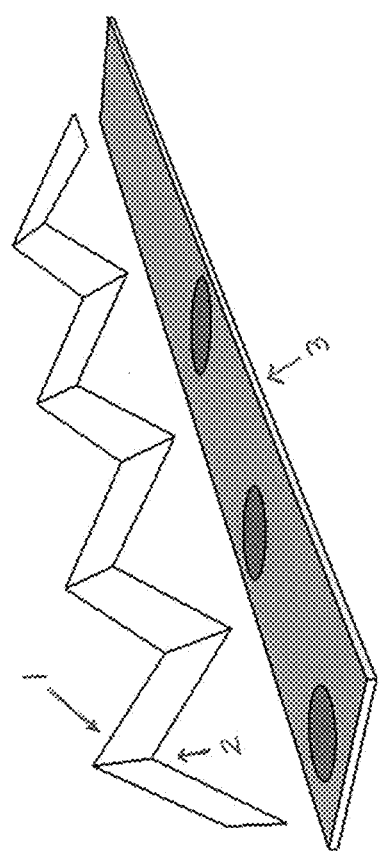
FIG. 28 is a drawing of an alternate "z" emitter configuration.

The z pattern employs sections of emitters which contiguously intersect along the longitudinal edges of the emitters forming a z pattern per three intersecting line edge sections of the emitters when viewed along an x or y axis orientation of the emitter (FIG. 28, 1 is heating surface, 2 is top of emitter). The z pattern may also be implemented in an emitter fashioned or molded from a single sheet or cast of metallic or ceramic material. Emitters conforming to a z pattern may also contain a degree of curvature to maximize infrared exposure to the food. The degree of curvature for the array and z pattern will depend on the size shape and quantity of food that is being exposed within the field of infrared radiation.

Depending on the skin thickness and sensitivity of the skin to heat and heating time, complete peeling for fruits and vegetables can be achieved by heating using a constant high IR emitter temperature or a variable IR emitter temperature. For fruits and vegetables with thin peel, such as peach, variable IR emitter temperature may be needed to avoid burning of the peel. Fruits and vegetables are heated with high temperature emitters first, followed by heating using the emitters with reduced temperature. Constant high IR emitter temperature heating is most appropriate for thick skinned produce or produce with low heat sensitivity. Additionally, scrubbers or abrasive discs and pads may be employed during or after variable or constant IR emitter temperature peeling for thick skinned produce or produce with low heat sensitivity.

Single-sided heating or double-sided heating can be used based on the design of the heating system and characteristics of fruits and vegetable to be heated. The shaped of the emitter is concave, wherein the degree of curvature may be adjusted to the particular fruit or vegetable to maximize heat exposure. The emitter surface temperature is in the range of 200-850° C. with corresponding wavelengths of 6.1-2.8 microns. The surface emitter temperature is inversely proportional to the heating time of the fruit or vegetable. The preferred emitter surface temperature is in the range of 200-750° C. (with corresponding wavelengths of 6.1-2.6 microns). The distance between the fruit surface and the emitter surface is between 5-40 mm. The preferred distance between the fruit surface and the emitter surface is between 5-15 mm. The shortest distance between fruit surface and emitter surface should not be less than 5 mm. The surface temperature of fruits and vegetables during IR heating is in the range of 70-100° C., preferably between 85-95° C. A heat reflective metal housing encasing the emitter(s) may also be employed to increase the efficiency of the IR zone of peeling.

When IR application occurs with the fruit on a conveyor belt, a preferred embodiment is the use of wells or recessions 3, FIG. 28, in the belt which hold and conform to the general shape of the produce to promote rotation and heat uniformity of the fruits and vegetables.

A further embodiment is the use of a vacuum chamber after IR heating to crack the peel/skin off of the fruits and vegetables. Vacuum enhances heat penetration and may be in the range of 20-30 inches Hg.

Fruits or vegetables subjected to infra-red peeling of the embodiments set forth above, exhibit a distinguishing feature of an intercellular (IEC) to intracellular (IAC) area (IIP) of 25% to 35%, as measured by scanning electron microscope (SEM), representing an IEC/IAC ratio of 2 to 5 times that of lye, steam and knife peeled methods (Tables 1 and 2). The IR treated sample has the highest IIP due to the thermal expansion of cell wall and middle lamella. Knife cut samples have a similar IIP to fresh control which is also the lowest IIP.

TABLE 1

| SEM quantification for tomatoes | | |
|---|---|---|
| Intercellular/intracellular percentage (%) | Treatment | Ratio of IR/Treatment |
| 9.4 | Fresh | 3.1* |
| 29.6 | IR | 1.0 |
| 14.7 | Lye | 2.0 |
| 6.62 | Steam | 4.5 |

Intercellular/intracellular percentage (IIP) = area of intercellular/area of intracellular*100%.
Treatment ratio = IIP by treatment A/IIP by treatment B (results round up to one decimal).
*Example: 3.1 = 29.6/9.4 = IIP of IR/IIP of Fresh

TABLE 2

| SEM quantification for pears | | |
|---|---|---|
| Intercellular/intracellular percentage (%) | Treatment Ratio | IR |
| 7.5 | Fresh | 4.1* |
| 30.8 | IR | 1.0 |
| 10.4** | Lye | 3.0 |
| 7.1 | Knife | 4.3 |

*Example: 4.1 = 30.8/7.5 = IIP of IR/IIP of Fresh
**observation of sever destruction of cell wall structure due to lye penetration

EXAMPLES

Example 1

IR Peeling of Tomatoes with Catalytic IR Emitters

Due to the variance in harvest time of different cultivars of tomatoes, three commonly grown cultivars (cvs.), Sun6366, CXD179 and AB2, of processing tomatoes (Lycopersicon Esculentum) were used for this study. They were grown by a commercial grower (Button & Turkovich Co., Winters, Calif.) in 2008 season and were hand harvested at red-ripening stage. Tomatoes considered to have defects based on visual observation were eliminated and only tomatoes with uniform sizes were used in the experiments. Tomatoes were washed by tap water and their surfaces were dried with paper towels. In order to avoid chilling injuries, tomatoes were stored no longer than 4 days in an incubator at 11±1° C. before being used for the peeling study. Due to high variation in weight, tomatoes that fell into the range of 70 to 110 g were used. The diameter of tomatoes at the largest transverse section was measured and the average was found to be 49±3 mm. The average height of tomatoes, which was determined from the stem scar to the blossom end, was 63±9 mm. Different tomatoes cultivars were used for different sets of tests depending on their harvest date and experimental schedule.

Peeling Performance

The ease of peeling was evaluated according to Mohr (1990) with some modification. The grading system based on a scale of 1 (unable to peel) to 5 (easy to peel), was used to describe the easiness of peeling of tomatoes heated under different conditions (table 3). A score greater than 4 was considered as an acceptable level for peeling easiness. This method is considered to be more sensitive compared to other mechanical evaluation methods for evaluation of peel loosening.

Peelability was used to determine the degree of peel removal and calculated as un-removed peel per unit weight ($cm^2/g$). According to FDA standard (21CFR 155.190), un-removed peel per gram of the raw product should be less than 0.015 cm2/g. This value was used in this study as a standard to determine whether the tomatoes were fully peeled or not. To measure the peelability, the residual skins on each peeled tomato were removed with a knife and then were aligned onto the grids of a sheet having each squared mesh of 9 mm2. The number of meshes was used to calculate the area of the residual peel.

Peeling loss, the weight change of tomato before and after peeling in terms of percentage, was used to determine the amount of tomato that was removed as by-product or waste (Garcia and Barrett, 2006a). It is desirable to have a low peeling loss from a peeling process.

Product Quality

Texture is one of the most important quality indicators of peeled tomatoes. A procedure developed in the Plant Science Department at University of California Davis was used to characterize the firmness of tomatoes (Cantwell, 2006). The firmness of tomatoes (N) was measured using a fruit texture analyzer FTA GS-14 (Texture Technologies Corp., Scarsdale, N.Y.) through a compression test. A 25-mm diameter probe with flat surface was used to compress the horizontally aligned whole peeled tomato to a distance of 5 mm under 5-mm/s forward speed. The color of peeled tomato was also measured at three different locations along the transverse direction. Tomato color was determined in L*a*b* color space using Minolta Chroma Meter CR200 (Minolta Crop., Ramsey, N.J.). According to Cantwell (2006), Hue° is considered to be the most appropriate value to measure tomato color rather than the individual chromatic components. Hue° was calculated using equation 1: $Hue° = \tan^{-1}(b^*/a^*)$ Table 3 Definitions of Peeling Easiness Grade Scale Description 1 Removal of the peel is too difficult; some areas fail to peel off or large amount of flesh remains on skin 2 Removal of the peel is difficult in most area of tomatoes; certain areas may not be peeled off 3 Removal of the peel is possible but some difficulties may exist at certain locations 4 Removal of the peel is possible with little effort; large piece of peels can be removed smoothly 5 Removal of the peel is possible without any difficulty; large piece of peels can be removed quickly and smoothly The surface temperature of tomatoes was an important processing parameter related to peel-loosening and degradation of pectin under tomato skin. Thus, the skin temperatures of the tomatoes at various IR heating times were measured using a non-contact IR thermometer (Lesman Instrument Company, Bensenville, Ill.). The reported temperature was the mean value of temperatures at four different positions on each tomato (two on the sides, one on blossom end, and one on stem scar). For lye peeling, the surface temperature of tomatoes was assumed to be equal to the temperature of peeling solution.

IR Peeling of Tomatoes

Regular lye peeling with NaOH was used as a control for the IR peeling. Tomatoes were dipped into 10% (w/v) NaOH solution at 95±2° C. for 30, 45, 60, and 75 s to simulate the typical industrial operation. The ratio of lye solution to tomato was 5:1. In order to prevent any cooking effect due to heating by the peeling solution, tomatoes were then submerged into a beaker containing tap water at room temperature for 30 s after the heating.

An IR heating system equipped with two catalytic IR emitters (Catalytic Drying Technologies LLC, Independence, Kans.), and powered by natural gas, was used in this research. The IR emitter has a heating surface of 300×600 mm. A custom-designed circular metal holder attached to a screw rod was used to place tomatoes between the vertically aligned emitters. The screw rod enabled the horizontal rotation of tomato for 90° every 15 s to improve heating uniformity. The schematic of the experimental device is shown in FIG. 1. Based on our preliminary tests the distance between the emitters significantly affected the peeling loss and peeling performance, thus the distances between the emitters were selected as 90±2 mm, 110±2 mm, and 120±2 mm for the tests. Tomatoes were heated with IR for 30, 45, 60, and 75 s. The rotation effect on the product quality and the peeling performance were investigated.

Statistical Analysis

Analysis of variance (ANOVA) and mean separation by Duncan's multiple range tests (p≤0.05) were applied to compare the treatments using SAS software package (SAS Institute, 1992). All reported values are the average of ten replicates. All tests were completely randomized so as to obtain independent observations.

Results of Tomato Studies

IR Peeling

Lye Peeling of Control Samples

For cv. Sun6366 the ease of peeling and peeling loss increased with the increase of dipping time for lye peeling (table 4). Even though all dipping treatments met the 0.015-cm2/g requirement of peelability standard, we observed that at least 45 is needed to achieve acceptable level of the easiness of peeling. In contrast, the cv. CXD179 needed less dipping time to achieve a similar easiness of peeling and showed a higher firmness. The firmness did not change much when the easiness was above level 4. The colors of the tomatoes were relatively stable under different heating durations. The results indicated that different varieties had different peeling performances and product qualities.

TABLE 4

Effects of lye peeling time on quality and peeling performance for tomato varieties of Sun6366 and CXD179.

| Cultivar | Methods and Conditions[a] | Peelability (cm²/g) | Ease of Peeling[b] | Peeling Loss (%) | Peeled Color (Hue°) | Peeled Firmness (N) |
|---|---|---|---|---|---|---|
| Sun6366 | Lye$_{10}$ 30s | .004 | 3.5a | 11.5 | 29.1 | 14.7a |
| Sun6366 | Lye$_{10}$ 45s | .008 | 4.1a,b | 11.7 | 29.4 | 12.7b |
| Sun6366 | Lye$_{10}$ 60s | .004 | 4.7 b | 13.4 | 29.5 | 13.7b |
| Sun6366 | Lye$_{10}$ 75s | .003 | 4.9c | 13.6 | 29.6 | 12.7b |
| CXD179 | Lye$_{10}$ 30s | .007 | 4.3 | 10.7 | 31.5 | 16.7 |
| CXD179 | Lye$_{10}$ 45s | .002 | 4.5 | 12.7 | 30.0 | 16.7 |

Subscript 10 of Lye$_{10}$ indicates the percentage of lye concentration in the lye solution.
Means with different letters in each column for each variety are significantly different at P < 0.05 level.

Peeling of Tomato cv. Sun6366

When IR was used for peeling with an emitter distance of 120 mm (table 4), the required IR heating time to achieve an ease of peeling score above 4 was 60 s which was about 15 s longer than the lye peeling. Compared to the control, the IR peeled tomatoes had much firmer texture and much less peeling loss, such as when the ease of peeling was above 4, the IR and lye peeled tomatoes had firmnesses of 14.7-17.5 and 12.7-13.7 N, respectively, and the corresponding peeling losses of 7.3-9.8% and 11.7-13.6%. All peeled products met the standard of peelability. In general, the rotation seemed to improve both the easiness of peeling and firmness and also reduced peeling loss, but did not have significant effect (P<0.05) on peeling performance and product quality.

Because of the parallel configuration of the emitters used in this experiment, rotating the tomato facilitated uniform surface heating of the tomato and thereby the penetration IR into the tomatoes to achieve minimum heating time. For industrial production, it a different configuration of IR emitters may be used to eliminate the need for tomato rotation and achieve uniform heating of the tomato surface.

Peeling of Tomato cv. Cxd179

For cv. CXD179, all IR peeled tomatoes met the peelability requirement (table 4). The heating rate and firmness of peeled products were improved when the emitter gap was reduced from 110 to 90 mm. Therefore, in order to provide higher heat fluxes to rapidly heat the surface of tomatoes, relatively smaller gap between emitters is generally recommended, but consideration should be given to cultivar differences as indicated by comparing the data on product surface temperature following IR heating (tables 3 and 4). For instance, the surface temperature of the tomato was 75° C. for emitter gap of 120 and 90 mm for Sun6366 and CXD 179, respectively. The easiness value of peeling reached to 4.8 and was significantly higher ($P<0.05$) than the control (4.5) when heating time was 45 s. However, the firmness of IR peeled tomatoes was in the range of 12.7 to 15.7 N, while the control gave 16.7 N for both results in table 2. The lower firmness of IR peeled tomatoes could be due to long exposure to IR heating. The average peeling loss of IR treated tomatoes was approximately 9% which was significantly lower ($P<0.05$) than that of control which was around 10.7%. The difference in peeling loss will likely be greater when the peels are removed by a mechanical peel eliminator in the industry. The color of IR peeled tomatoes was similar to the control.

Example 2

IR Peeling of Peaches Catalytic Emitters

Materials

Clingstone peaches (*Prunus persica*) without visual defects were used in this study.

The geometrical characteristics of peaches are very important for IR peeling and were measured by using a digital caliper to determine the total height, diameter in cheek direction, diameter in suture direction, diameter at 45° away from suture, and shoulder height, as well as the height, width, and thickness of pit (shown in FIG. 1). We also measured the other physical and chemical attributes of fresh peaches, including fruit weight, volume, density, firmness, color, surface area, and soluble solid content and used the information for calculation of peeling performance. The sugar content of fresh peaches was determined using a refractometer (N-50E, Atago, Tokyo, Japan) with a reference temperature of 23° C.

Peeling Procedures

Lye Peeling

Lye peeling was used as a control for the IR peeling. Peaches were first dipped into 3% (w/v) KOH solution with a temperature of 95±2° C. for 3 seconds and then were immediately placed into a steamed chamber with an average temperature of 70±4° C. for 39 seconds, which simulates the typical industrial process. After the heat treatment, each side of the peach was sprayed for three times with water at a pressure of 350 kPa/50 psi to remove the skin. To further explore the peel removal potential, the partially peeled peach was hand-scrubbed by a trained technician and was dried with paper towel.

IR Peeling

Figure 4A:
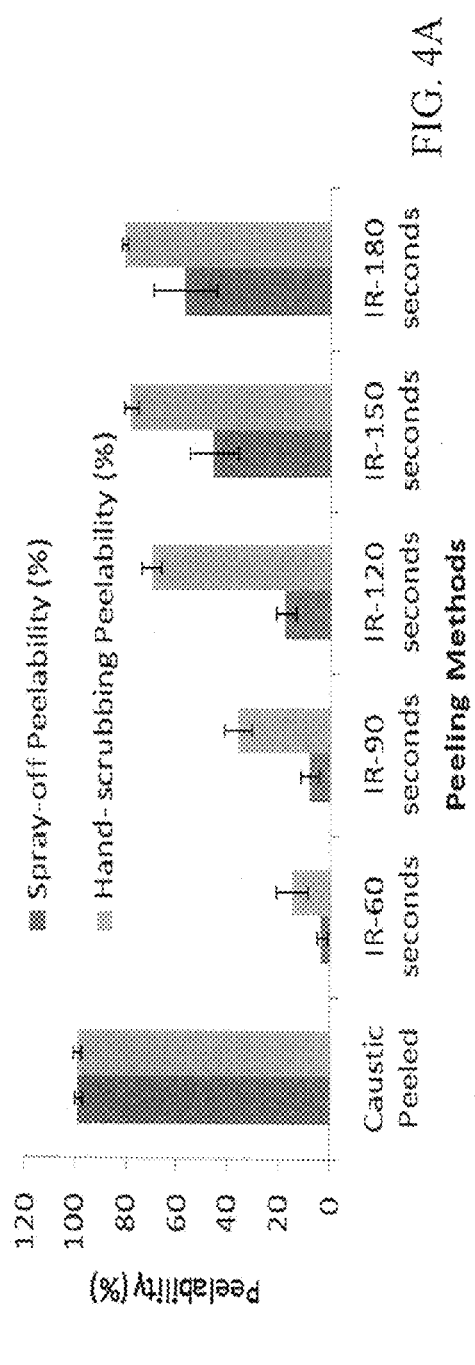
FIG. 4 is a graph of peeling performance and product quality with different IR heating times.
Figure 4B:
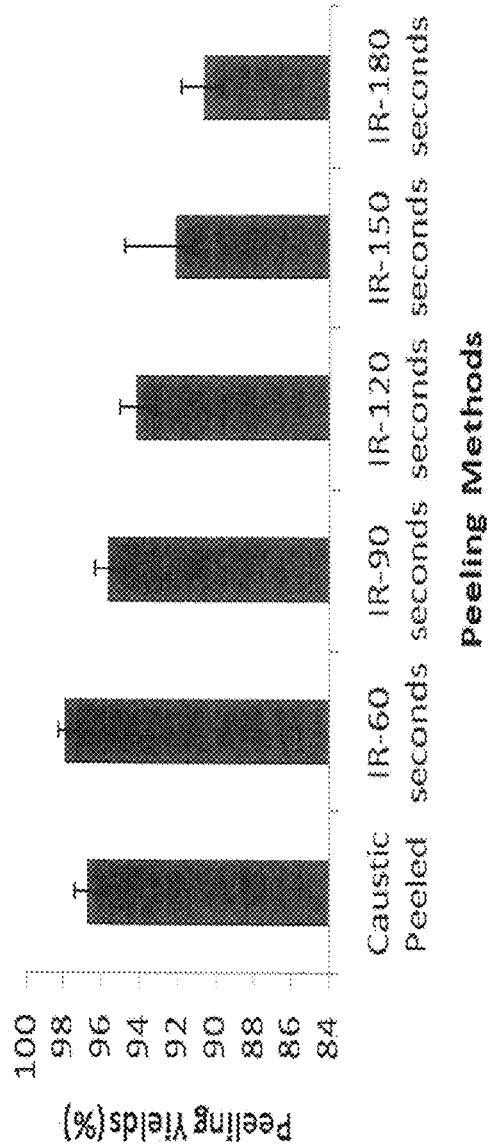

An infrared heater equipped with two catalytic IR emitters powered by natural gas was used in this research. Each emitter has a surface area of 30×30 cm and an intensity of 8000 $W/m^2$. To place the peach in the heater, a custom-designed metal rod holder was used and attached to the tip end of the fruit. The peach was located at the center between of the IR heating emitters (FIG. 4). Based on our preliminary tests, the tested distances (gap sizes) between the emitters were selected as 90±2, 115±2 and 140±2 mm for studying the effect of gap size on peeling performance when medium size peach (65 mm diameter in cheek direction) and heating times of 90, 135 and 180 seconds were used. To study the effect of heating time, we tested five heating periods, 60, 90, 120, 150, and 180 seconds, using medium size pear and gap size of 115 mm. To examine the effect of peach size, we used peaches with three sizes, 60±1 mm, 65±1 mm, and 70±1 mm under gap size of 115 mm under three heating time periods, 90, 135 and 180 seconds. The initial temperature of peaches before heating was 23±2° C. (room temperature). All tests were conducted within two days after the peaches were received. Peaches used in the second day were stored in an incubator at 2±1° C. during the night and then tempered in the room condition before testing. To remove the skin of IR treated peaches, the same peel removal procedures adopted for lye peeling were also applied for IR peeling.

Peeling Performance and Product Quality Evaluation

Peeling Performance

Peelability (%) was calculated by dividing the un-removed peel area by total fruit surface area and expressed as percentage. The un-removed (residual) skin area on a peeled peach was determined by using a sheet with grids and a USDA standardized square-grid plate with known area. Peach total surface area was predicted based on corresponding fruit weight using a regression model we developed.

Peeling yield (%) is the weight difference of a peach before and after peeling divided by original weight and expressed as percentage.

Moisture loss (%) is the weight difference of a peach before and after IR heating divided by the original weight and expressed as percentage. It reflects the amount of moisture evaporated during IR heating.

Heat ring depth (mm) is a measure of excessive heating causing color change at outer periphery of peach flesh. It was determined by observing color change of peach after it was cut.

Product Quality

Color (surface color of fresh and peeled peaches) was measured at three different locations along the fruit transverse direction in the CIE L*a*b color space using a Minolta Chroma Meter CR200 (Minolta Crop., Ramsey, Japan). All color readings of peeled fruits were taken approximately 5 min after peeling. The color difference was calculated using Eq. (1) and a smaller value indicates less color change before and after peeling.

$$\Delta E=[(L^*-L_0^*)^2+(a^*-a_0^*)^2+(b^*-b_0^*)^2]^{1/2} \quad \text{Eq. (1)}$$

For fresh, before color measurement the skin (0.5 mm thickness) was removed with knife. The same area was used for texture measurement.

Texture (firmness of peaches) was measured by using a fruit texture analyzer FTA GS-14 (Texture Technologies Corp., Scarsdale, USA) based on a puncture test. A 7.9 mm diameter round-ended probe was used to punch through the peach fruit (see figure below) to a distance of 10 mm under a 5 mm/s forward speed.

The surface and internal temperature profiles during IR heating and after heating were determined using thermocouples (FIG. 5) (hypodermic miniature type-T thermocouples (HYP1, Omega Engineering, Inc., Stamford, Conn.)

with a wire diameter of 0.3 mm), sensing bead diameter of approximately 60 um, and response time of 1.5 ms). HH147 data logger (Omega Engineering, Inc., Stamford, Conn.) was used to record the temperature change. We measured the surface temperatures at four different locations, including a point on the cheek of peach which is closest to the surface of the top IR emitter, a point on the suture of peach which is along the same longitude of the cheek point, each point from tip and stem end of peach fruit, which are along the same latitude of the cheek point. The four locations for the internal temperature measurements were 2, 4, 8, and 16±0.2 mm below the peach surface.

Statistical Analysis

Relationship between surface area of each individual peach and its weight was predicted through linear regression analysis. All reported values are the average of ten replicates.

Results

Figure 5:
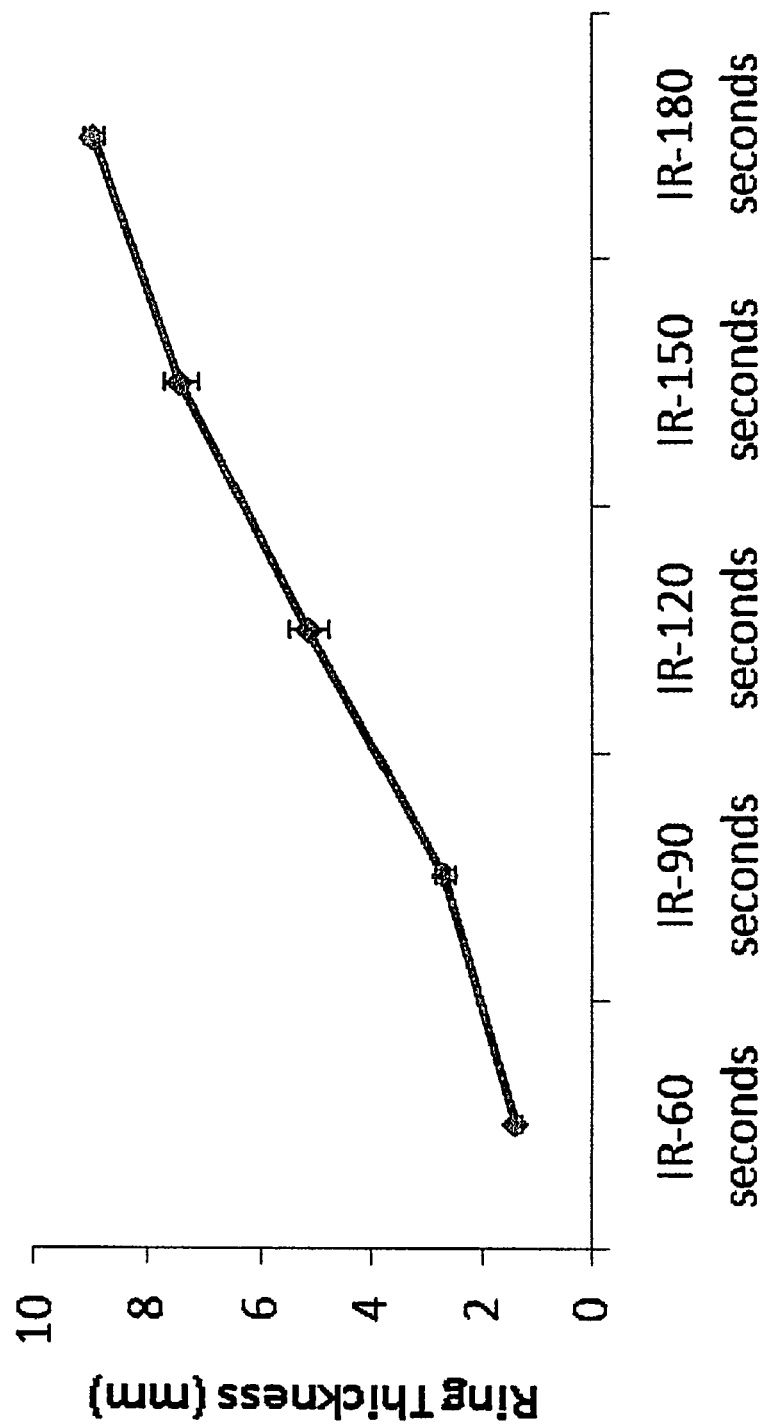
FIG. 5 is a graph of the depth of heating ring at different time intervals.

A result summary of the determined physical parameters of peaches is shown in Table 5. The mass and surface area varied from 101.4 to 255.6 g and from 10156.4 to 18152.7 $mm^2$, with mean values of 150.6 g and 13791.6 $mm^2$, respectively. Dimensions varied from 55.4 to 79.4 mm in total height, 53.9 to 74.9 mm in the direction of suture, and 54.4 to 83.3 mm in cheek thickness, with average values of 66.3, 64.5, and 65.9 mm, respectively. Mean of the diameter of 45° away from suture direction was slightly higher than the other measures because of the indented irregular shape at the suture. The means of three-dimensional size of pit (i.e. length, width, and thickness) were 36.0, 19.4, and 25.5 mm, which did not change significantly for different size of fruits. Whole fruit volume and density varied between 106.2 and 270.4 $cm^3$ and between 0.897 and 0.985 $g/cm^3$, with average value of 157.3 $cm^3$ and 0.957 $g/cm^3$, respectively.

peeling, lye peeling had higher peelability and yields, but caused more color change which is not desirable. Based on this set of test, it is concluded that minimum IR heating time of 90 seconds is necessary to achieve significant amount of peel removal. The depth of the heating ring increased with increasing of IR heating time (FIG. 5). It is desirable to eliminate or minimize the heating ring after peeling, which might be achieved by reducing the IR heating time by increasing IR intensity and/or changing the configuration of IR emitter.

Effects of Peach Fruit Size

Figure 6:
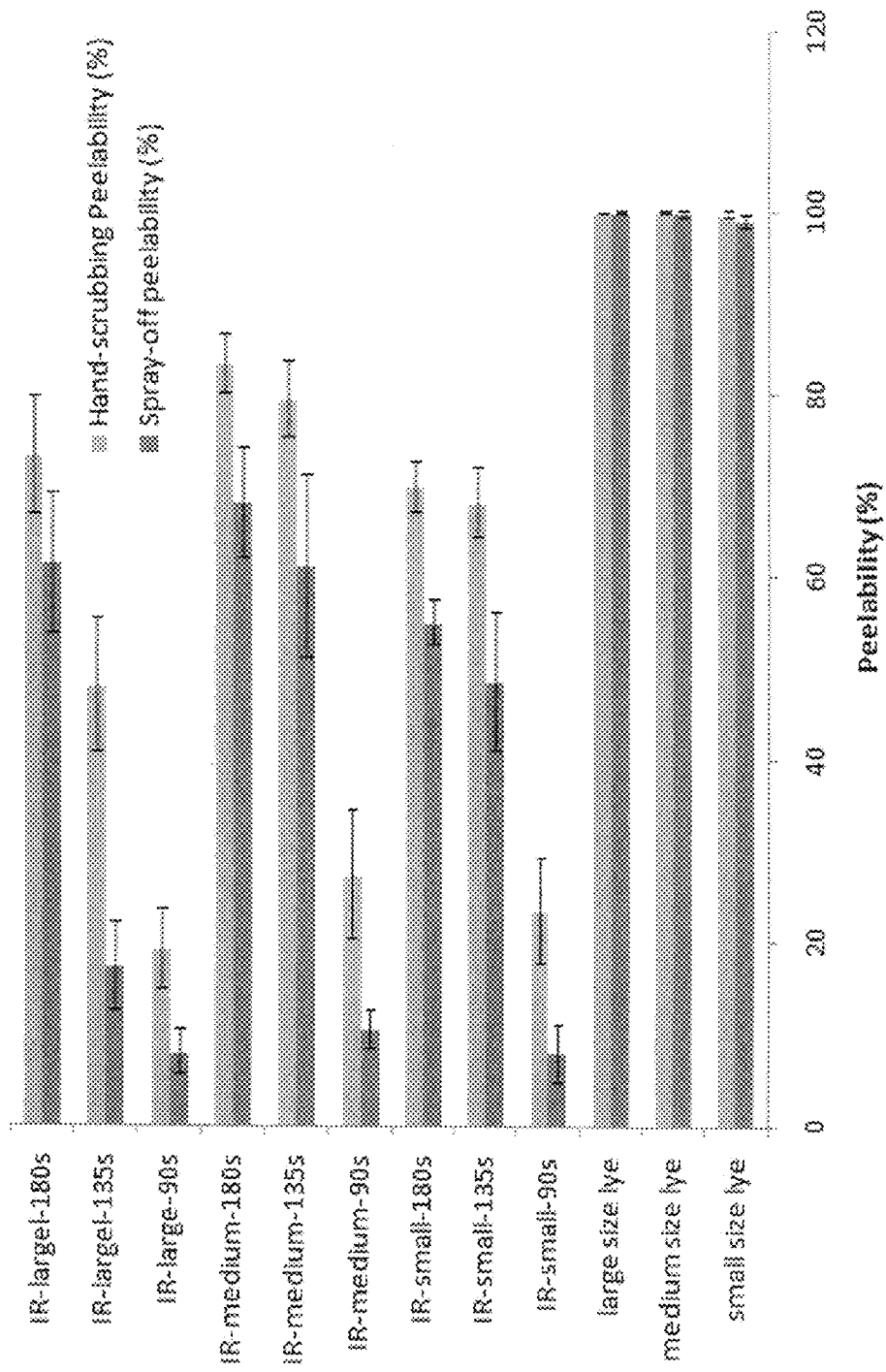
FIG. 6 is a graph of percent peelability for hand scrubbed and spray off.
Figure 7:
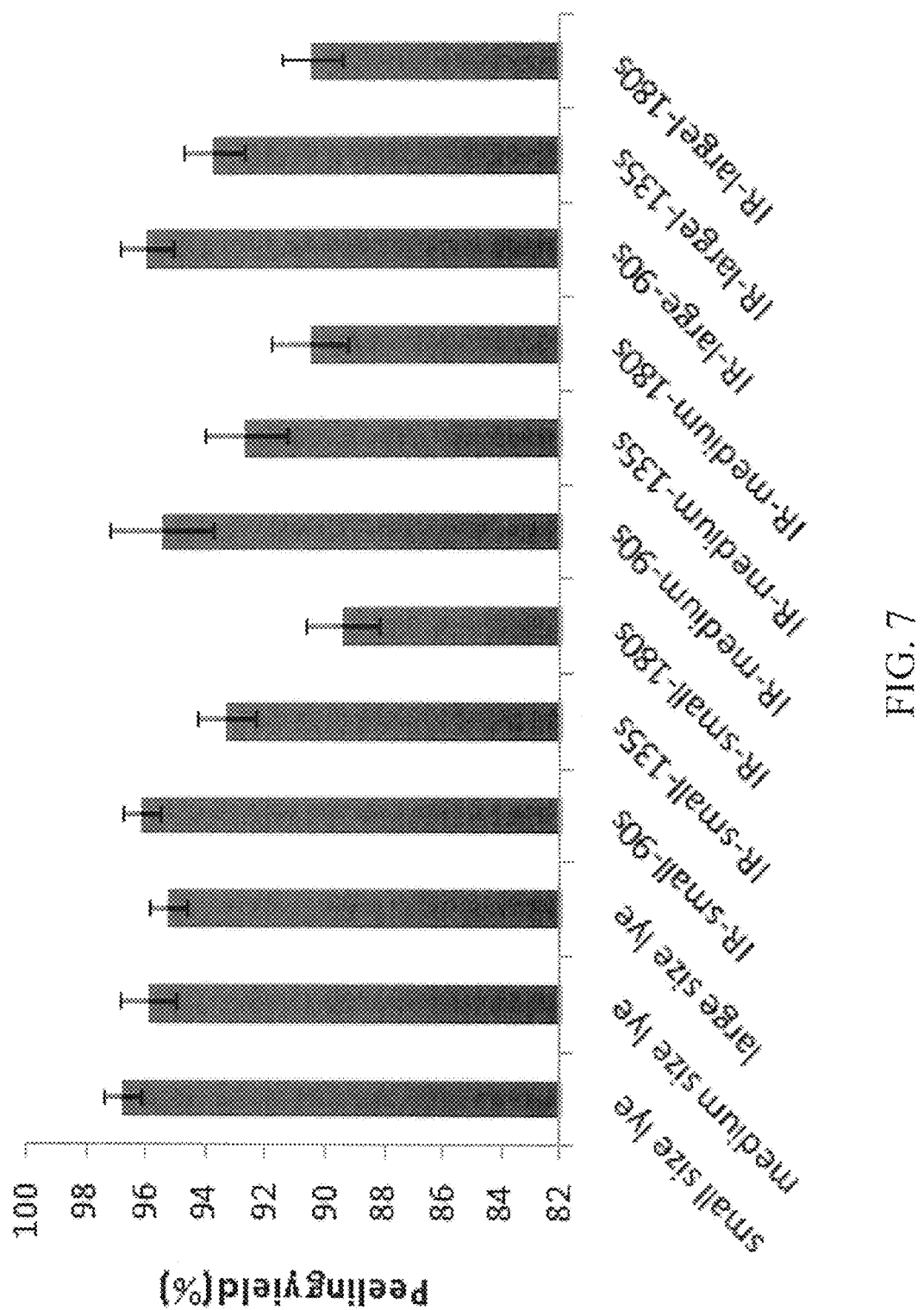
FIG. 7 is a graph of peeling yield for different time intervals of lye and infrared peeling.
Figure 8:
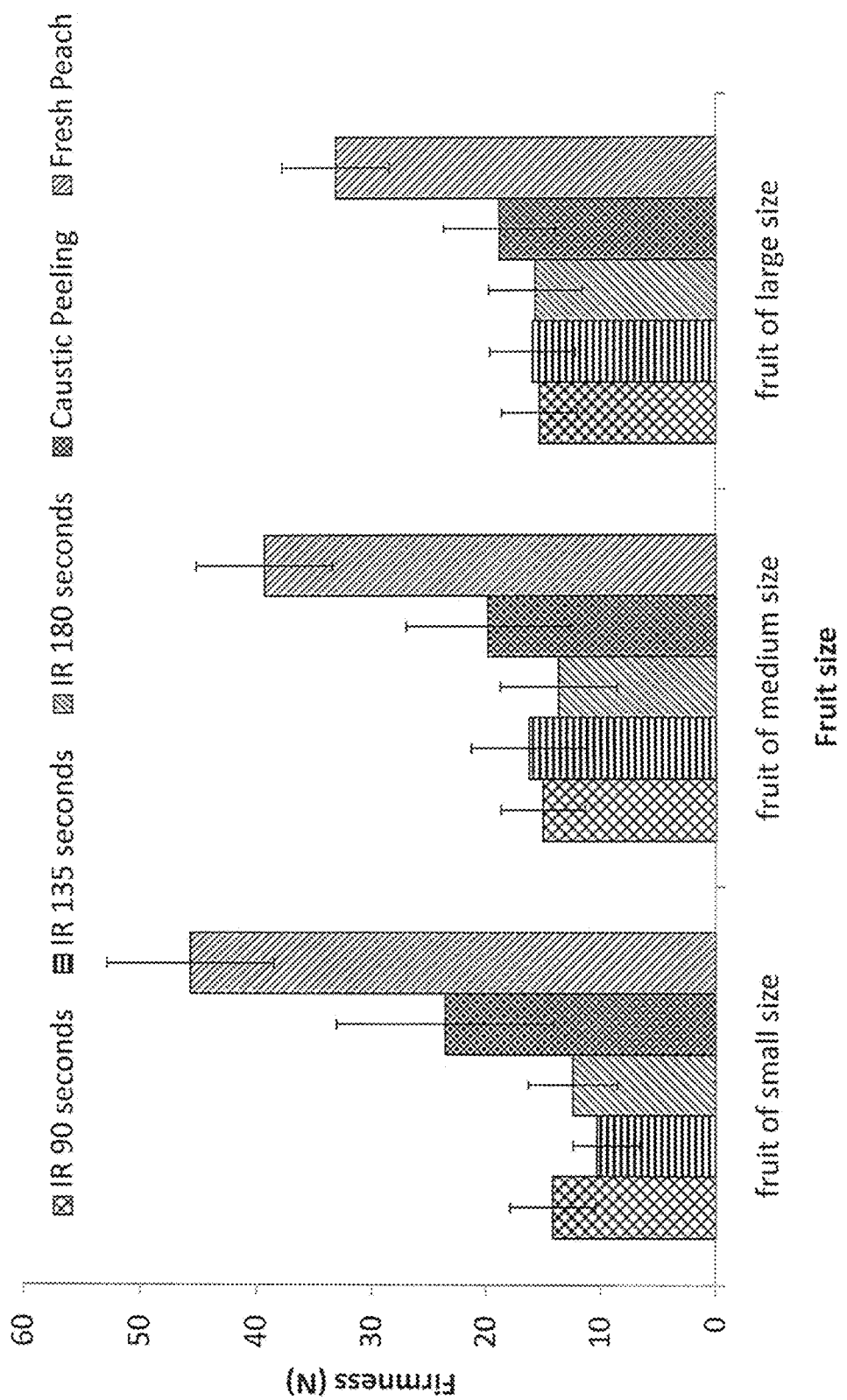
FIG. 8 is a graph of firmness for small medium and large fruit sizes with IR and caustic peeling.
Figure 9:
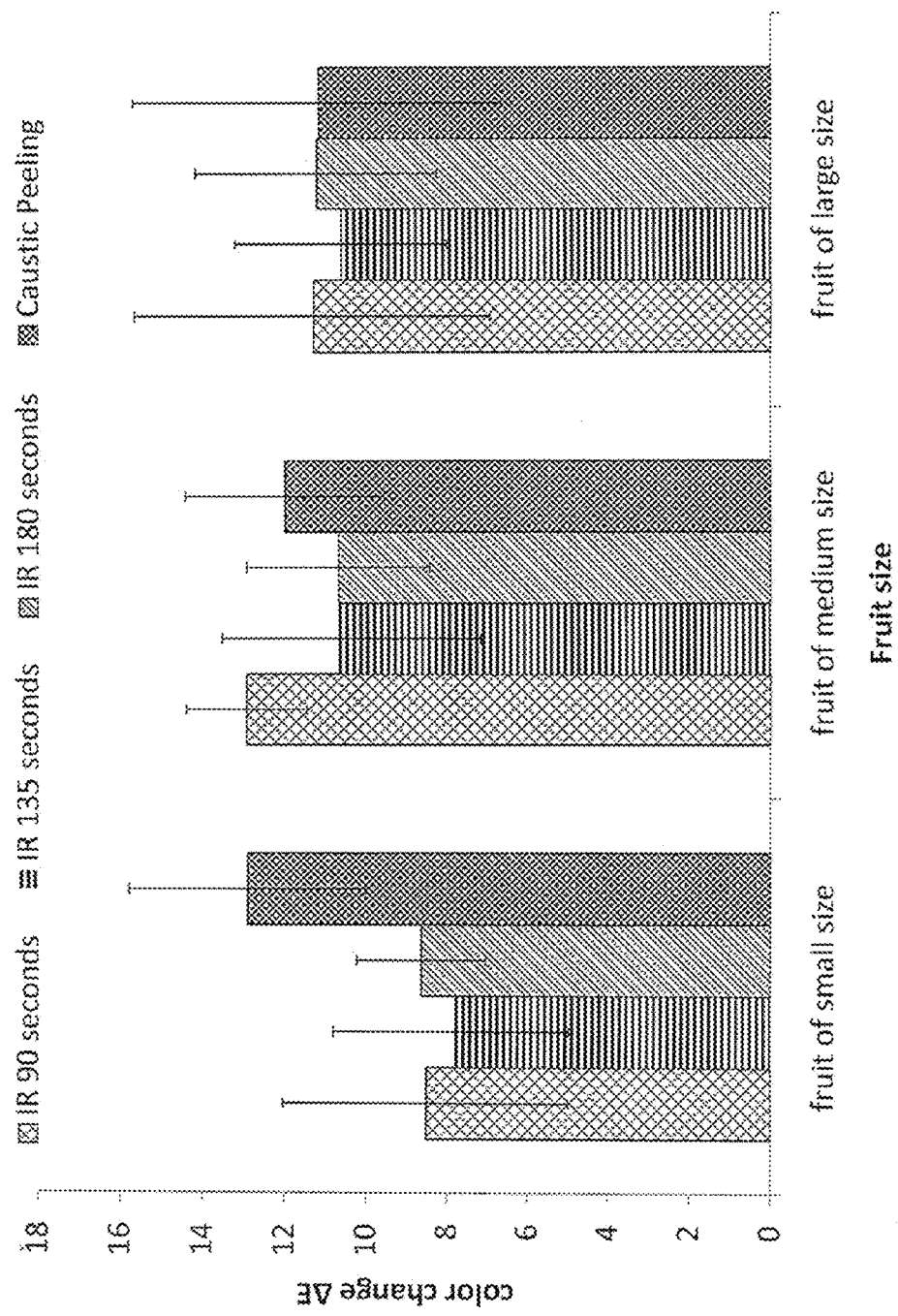
FIG. 9 is a graph of color change for small medium and large fruit sizes with IR and caustic peeling.
Figure 10:
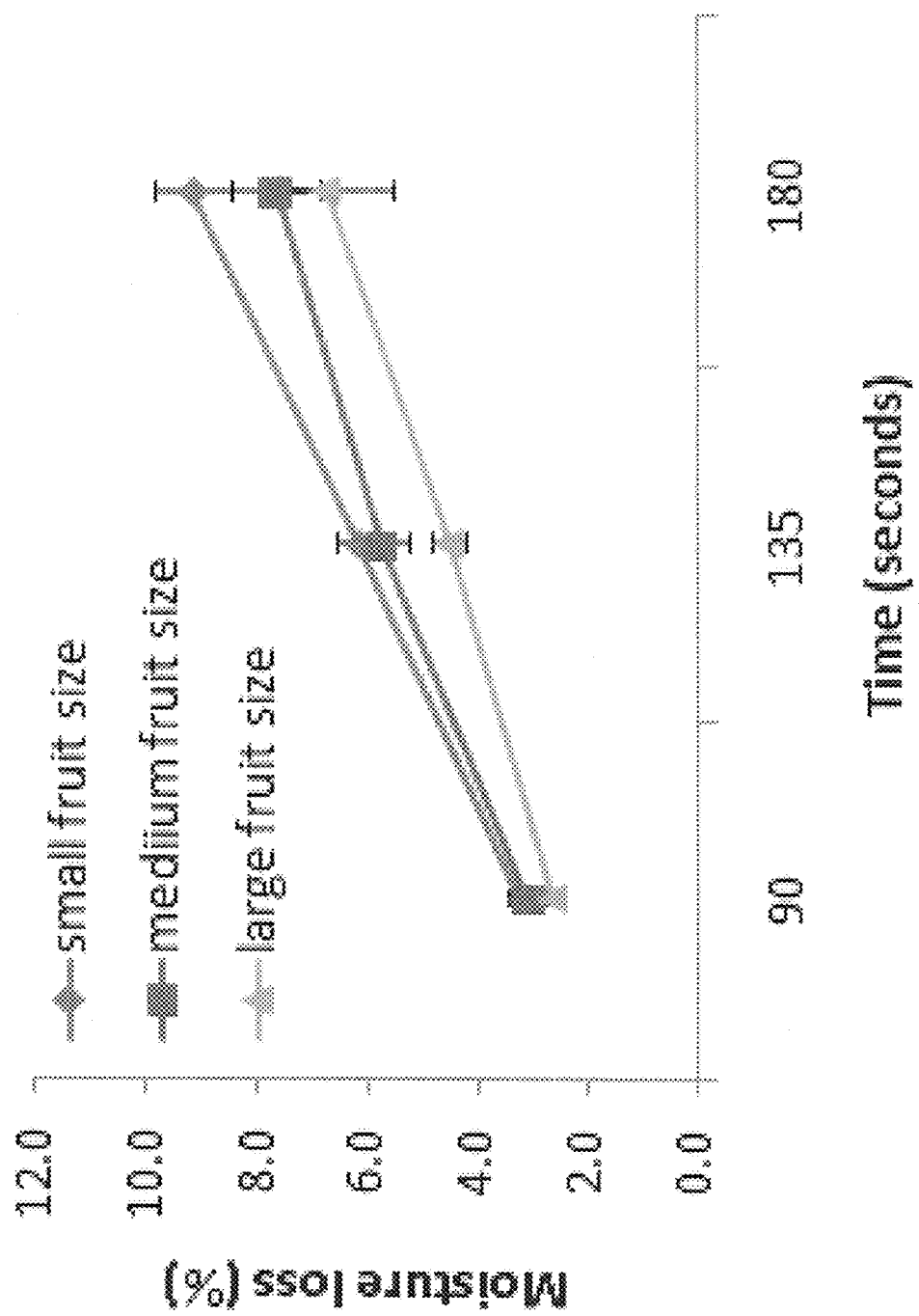
FIG. 10 is a graph of moisture loss of small, medium and large fruit sizes with IR heating.

To determine the effect of fruit size on peeling performance, the emitter gap was set at 115 mm and three heating times were tested. The three sizes (60, 65, and 70 mm) of peaches performed differently (FIG. 6). The IR peelability increased with the increased of peeling time and reached maximum of 87%. The small size peaches had lower peelability due to less heating because the fruit surface was farther away from the emitter surface. But they had a higher peeling yield due to less peel removal (FIG. 7). The firmness of both IR and caustic treated peaches was lower than fresh peaches (FIG. 8) and the color changes of peeled peaches were similar regardless of the peeling methods (FIG. 9). Moisture loss increased with the increase of IR heating time for all sizes of peaches while the smaller the fruit had the higher the moisture loss which could be due to large surface area to volume ratio (FIG. 10).

Effect of IR Emitter Gap

Figure 11:
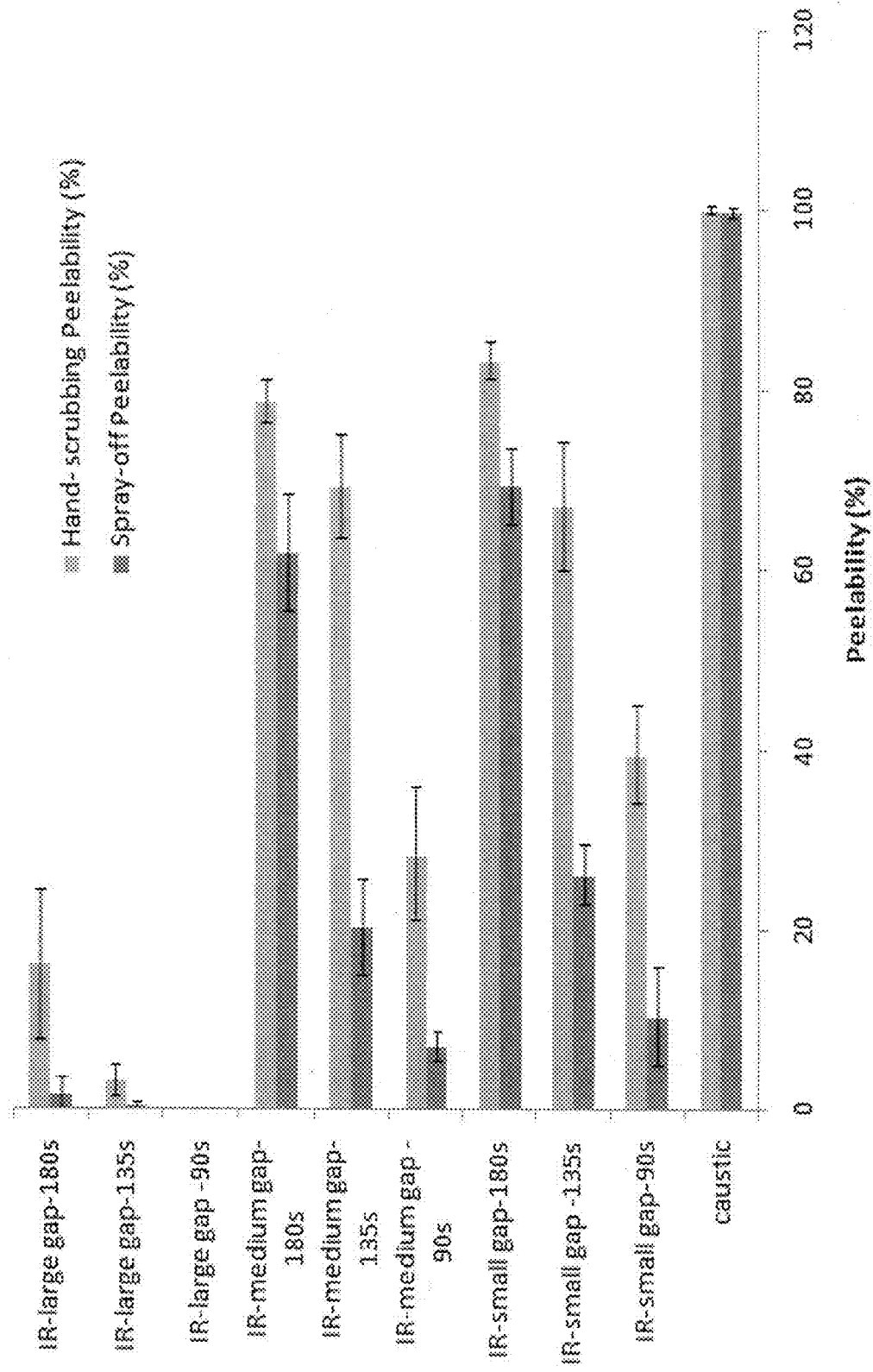
FIG. 11 is a graph of peelability for IR and caustic with varying emitter gaps.

Three emitter gap sizes, 90, 115 and 140 mm, were tested using medium size peaches (65 mm) under three heating times (FIG. 11). When the gap size was reduced from 140 mm to 115 mm, the peelability was significantly improved. The peeling yields also showed a trend of improvement with gap

TABLE 5

Geometrical properties of peaches ( n = 149)

| | | | Fruit Dimensions | | | | Volume and Density | | | Pit Dimension | | |
|---|---|---|---|---|---|---|---|---|---|---|---|---|
| Stat. | Mass (g) | SH (mm) | Total Height (mm) | D-suture (mm) | D-thickness (mm) | D-45 deg. (mm) | Peach Volume (cm3) | Peach Density (g/cm3) | Surface Area (mm2) | Length (mm) | Height (mm) | Width (mm) |
| mean | 150.6 | 9.7 | 66.3 | 64.5 | 65.9 | 67.0 | 157.3 | 0.957 | 13791.6 | 36.0 | 19.4 | 25.5 |
| std | 31.5 | 1.2 | 4.6 | 4.0 | 5.9 | 5.0 | 32.6 | 0.016 | 1573.5 | 2.6 | 3.5 | 2.7 |
| max | 255.6 | 13.2 | 79.7 | 74.9 | 83.3 | 82.1 | 270.4 | 0.985 | 18152.7 | 42.1 | 37.3 | 38.1 |
| min | 101.4 | 5.7 | 55.4 | 53.9 | 54.4 | 55.7 | 106.2 | 0.897 | 10896.4 | 26.0 | 15.7 | 5.7 |

Figure 3:
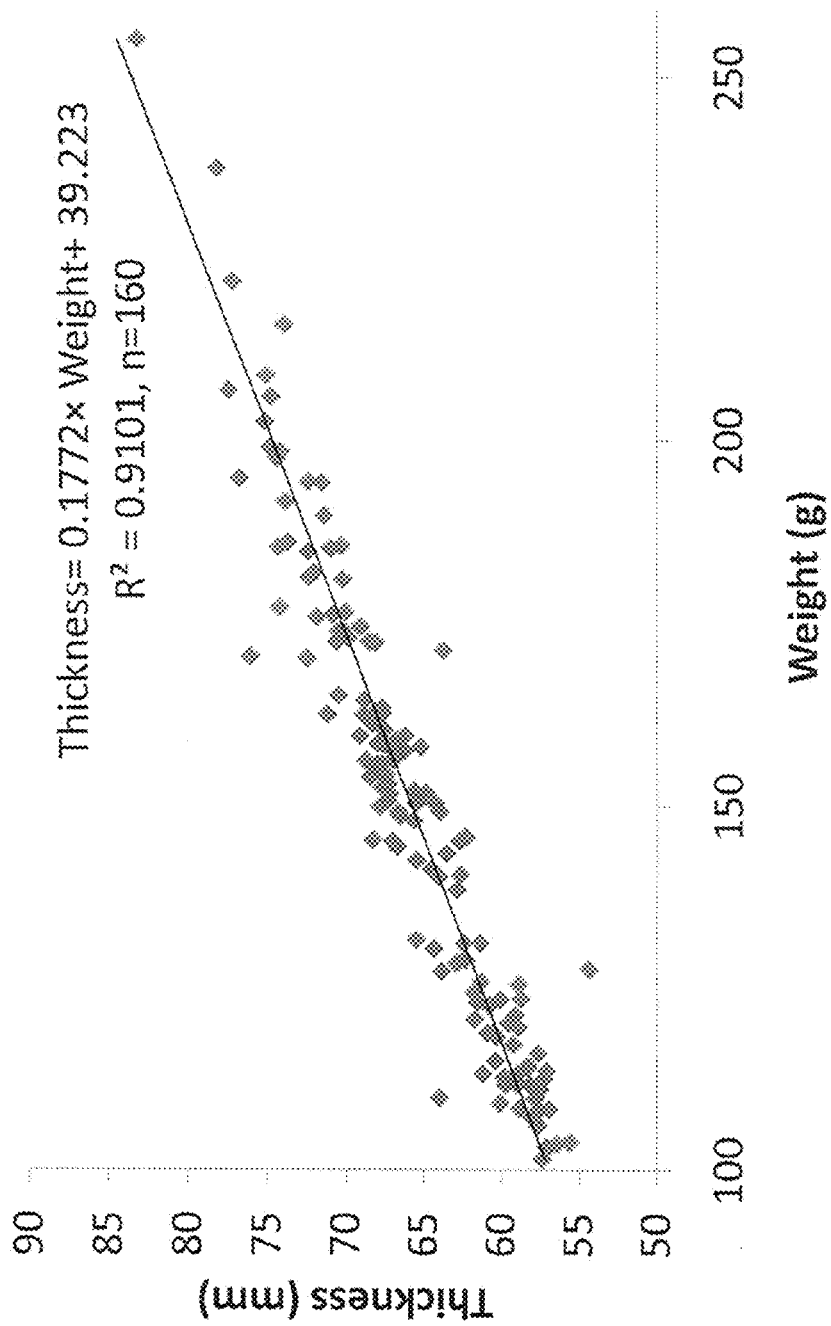
FIG. 3 is a graph of the linear relationship between peach weight and size.

It was found that 80% of fruit had weight below 178 grams and sizes less than 73 mm. Because the cheek thickness of peach is an important parameter for IR peeling, the distribution of fruit mass and the thickness (diameters in cheek direction) is plotted in FIG. 3. Based on the size (cheek thickness) distribution, we classified the fruits into three groups, i.e. small, medium, and large, with average values of 60, 65, 70 mm, respectively. For the samples used for peeling tests, peaches in each group had a size variation range of 4 mm.

IR Peeling—Effect of Heating Time

Figure 12:
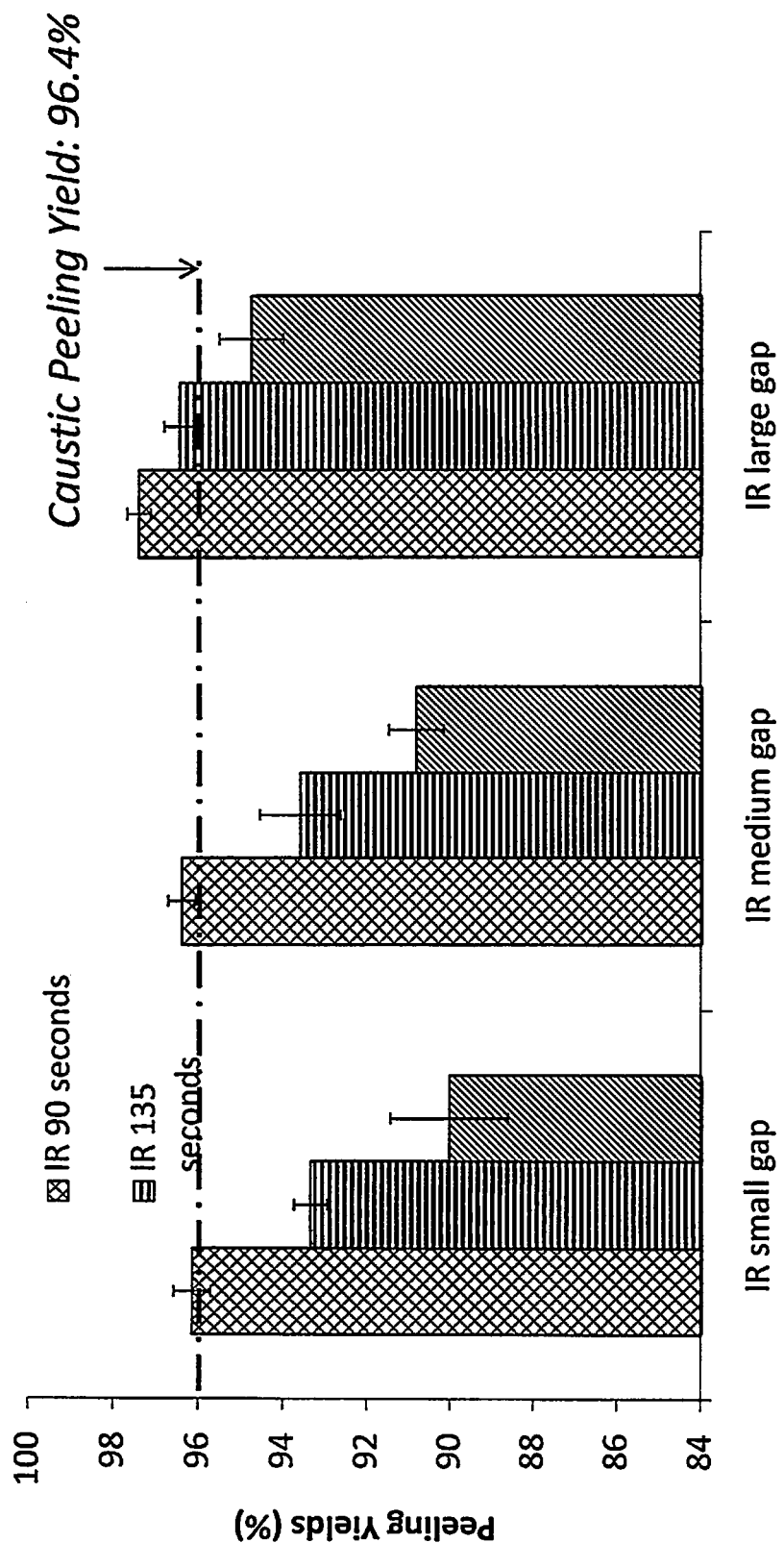
FIG. 12 is a graph of peeling yields for IR and caustic with varying emitter gaps.
Figure 13:
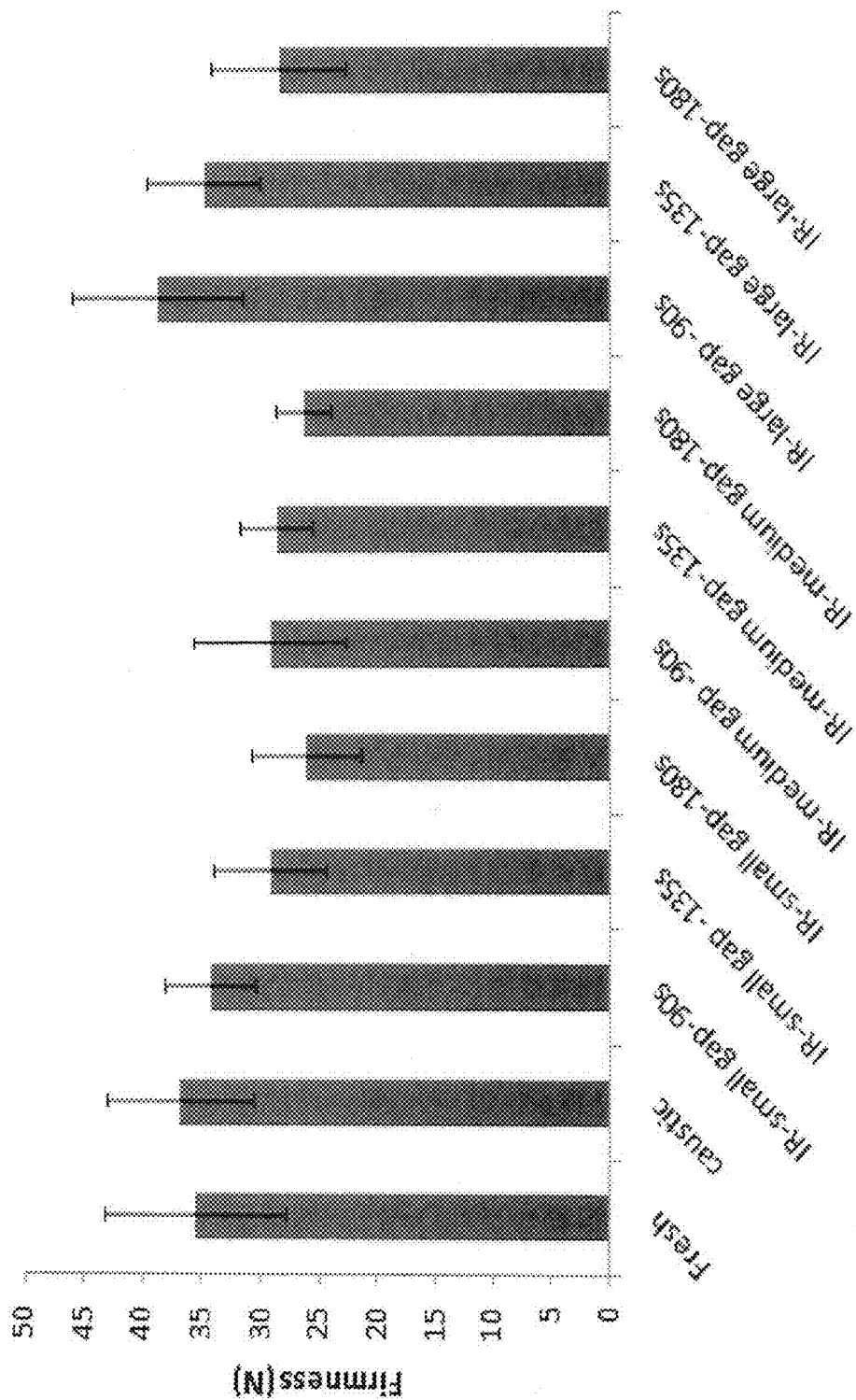
FIG. 13 is a graph of firmness in different gap sizes of emitters.
Figure 14:
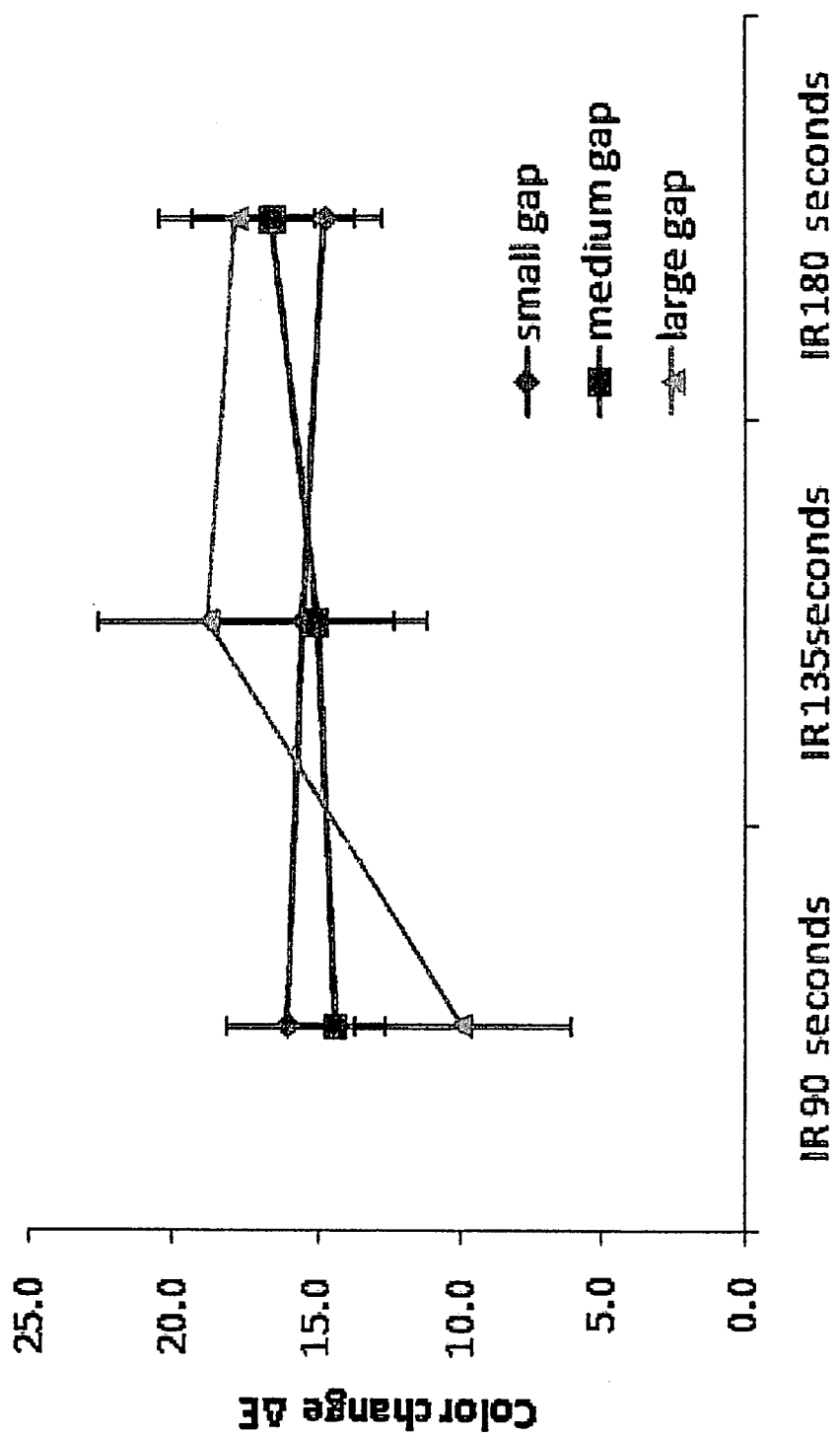
FIG. 14 is a graph of color change in different gap sizes of emitters.

The tests were conducted with peach size of 60 mm and emitter gap size of 115 mm. The peaches were partially peeled with hand scrubbing after IR heating up to 90 seconds (FIG. 4). The heating time had significant effects on the peelability, peeling yields, peeled peach firmness and color changes. At the heating time of 180 sec, the peelability reached about 80%, but the peeling yield was lowered due to moisture loss and peel removal. In general, compared to IR reduction. By reducing the gap to 90 mm, the IR treated peaches achieved a similar peeling yield as caustic peeling and had maximum peelability of 85% (FIG. 12). The reduced gap size might provide more uniform heating on the peach surface (FIG. 13). All tested peaches under different gaps had similar color changes. Furthermore, it was observed that the smaller gaps of IR treatments resulted in slightly lower peel firmness than the selected caustic peeling (FIG. 14). Under the smaller gap level of IR treatment, peelability and peeling yields increased as the heating time increase. This indicates that a narrower gap, longer time and more uniform heating was correlated to a better peeling performance.

Temperature Distribution

Figure 15:
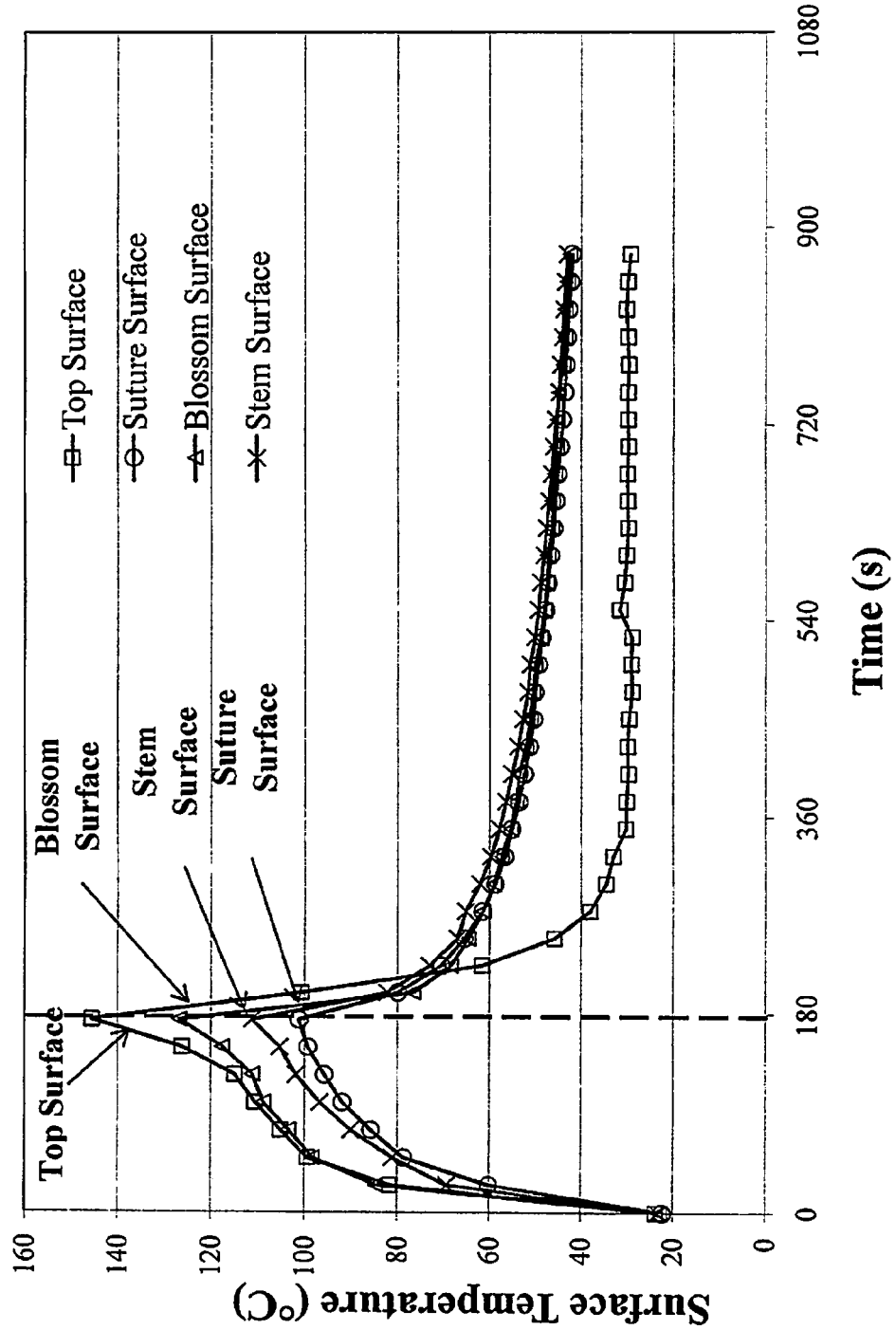
FIG. 15 is a graph of surface temperature of blossom, stem and suture at time intervals.

FIG. 15 shows the changes in temperature at four locations on the peach surface during and after IR heating. The vertical line denotes the end of 180 seconds of IR heating. The results indicated that surface temperature increased quickly during IR heating and continued to increase for a short time even though the peach was removed from the heater, finally decreased. There was a maximum temperature difference of about 20° C. among the different locations. This demonstrated that it is necessary to improve the heating uniformity in the future. One of the ways to improve the heating uniformity is to design the emitter with curvature profiles similar to that of the peach shape.

Figure 16:
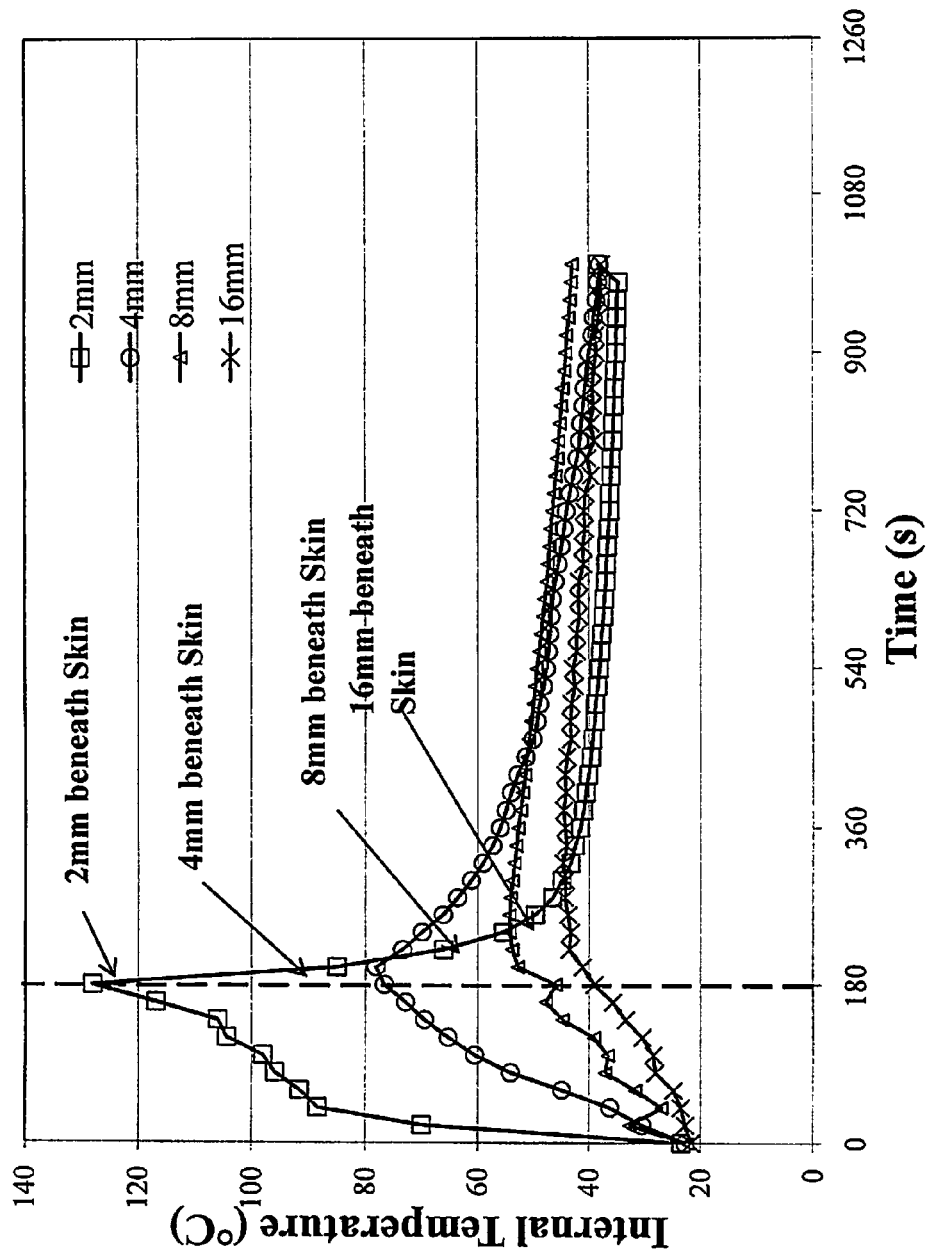
FIG. 16 is a graph of internal temperature of varying skin depths.

The internal temperature distribution showed that there was a huge difference at different locations (FIG. 16). The temperature at 2 mm below the surface was similar to the surface heating profile, but much higher than that at 4 mm. This indicated that the IR heating mainly heated the surface layer. The low temperature in the peach is desirable to achieve high quality product with high firmness. If the IR intensity is increased, the required heating time could be reduced, which would lead to reduced heating ring.

Example 3

IR Peeling of Pears Using Ceramic Emitters

Peeling Procedures

Figure 17:
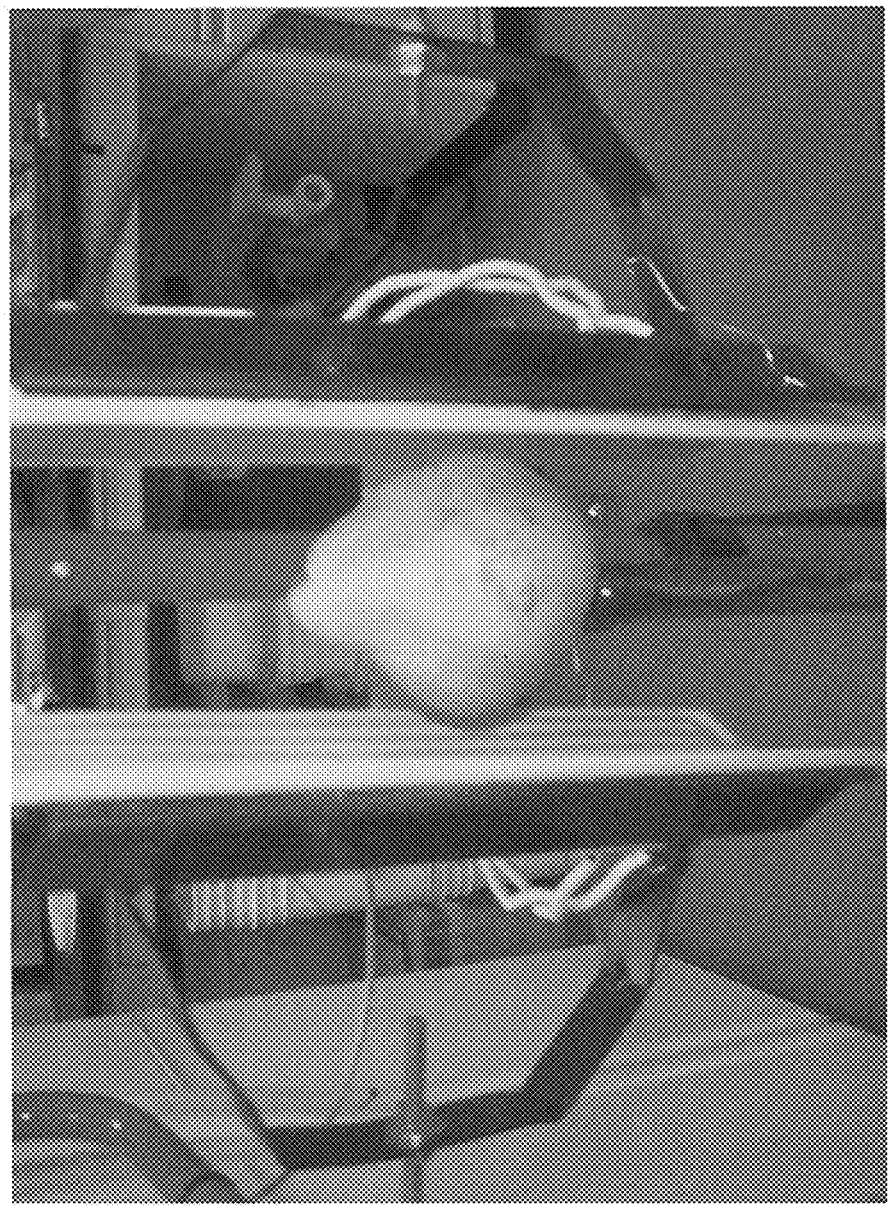
FIG. 17 is a photo of an infrared peeling apparatus utilizing a rotating platform.

The weights of Bartlett pears used in the test were in the range of 130-332 g. For infrared heating of pears a vertical emitter setup where the emitter plates were parallel to one another was used (FIG. 17). The emitters were placed with a gap of 3.85 inches between them. A rotating rod was placed on a base beneath the emitter stand and was used to rotate the pears. All pears were placed upright on the rod and rotated during their time in the emitter. The rotating rod was marked and emitters remained untouched so the setup was centered at all times. Testing was carried out on medium size pears placed in the infrared emitter setup for 60, 45, 30, 25, and 15 seconds. 10 Replicates were carried out for each period of time that was experimented with.

Peeling was conducted using hand scrubbing. Each pear was hand scrubbed by the same person using only the thumb below the knuckle to rub the skin off and was done using running water. Due to the nature of a pears' geometry it was deemed unpractical to set a time for hand scrubbing and peel removal however, no area of pear was subjected to peeling other than an initial one-time go over. Peel removal took place over a fine sieve so all removed peel was caught, strained from any possible water retention and set aside for observation.

Peel Removal

Figure 18A:
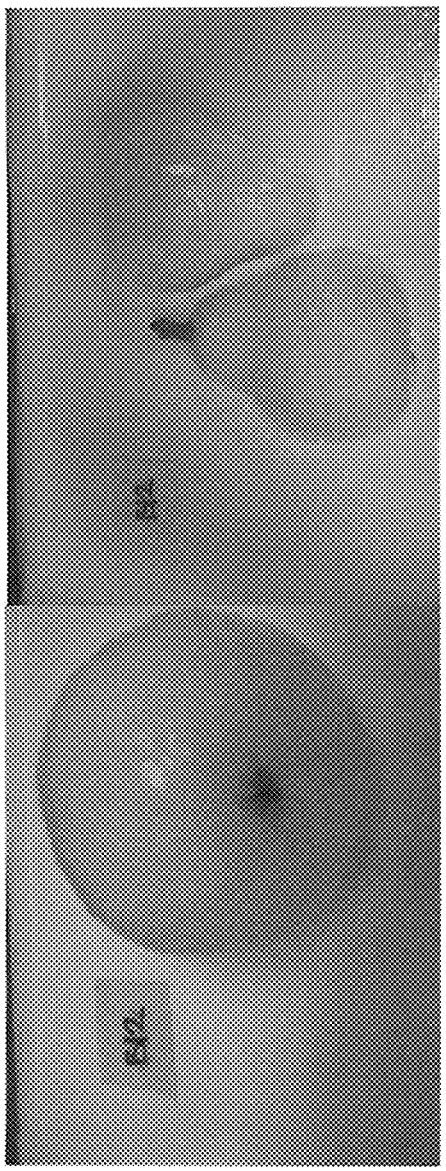
FIG. 18 is a photo of a peeled Bartlett pear after 60 and 45 seconds of infrared treatment.
Figure 18B:
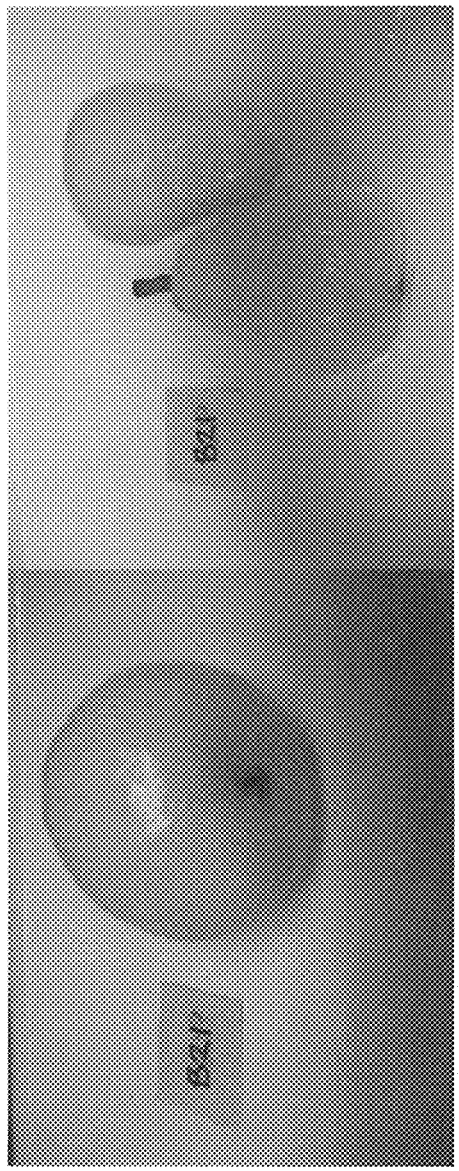
Figure 19:
FIG. 19 is a photo of peeled skin from Bartlett pear after 60 and 45 seconds of infrared treatment, respectively.
Figure 19:
Figure 20C:
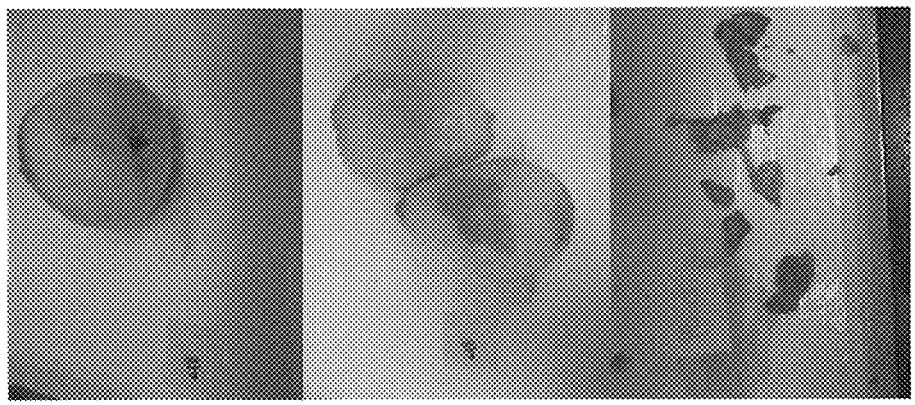
FIG. 20 is a photo of a peeled Bartlett pear after 30, 25 and 15 seconds of infrared treatment and peel remnants.
Figure 20B:
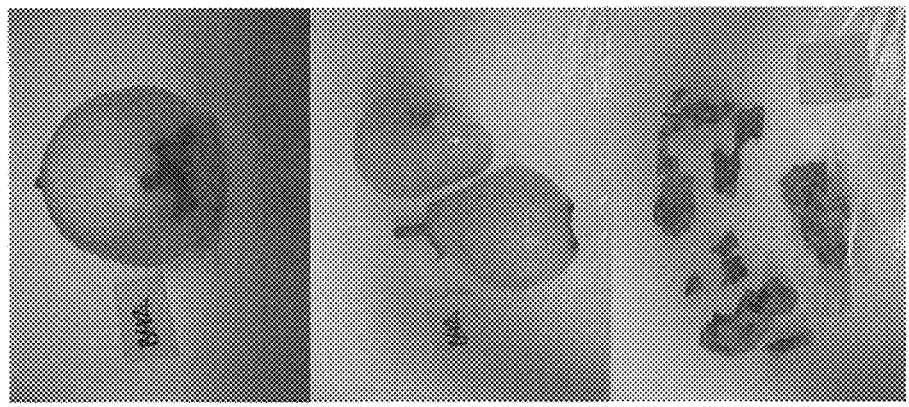
Figure 20A:
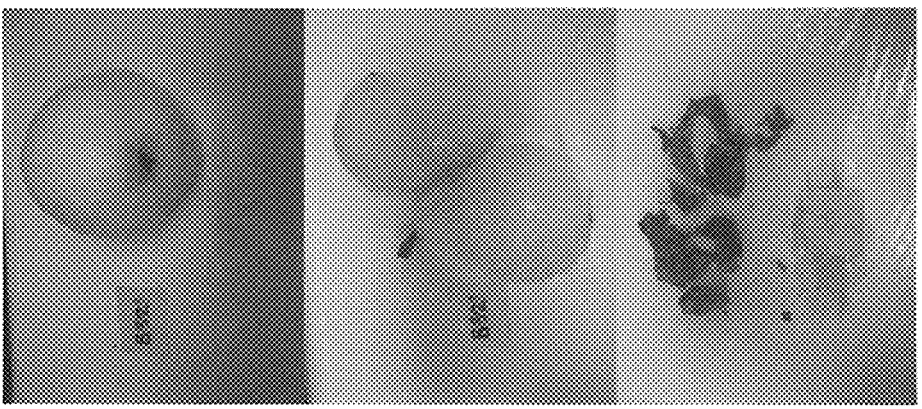
Figure 21A:
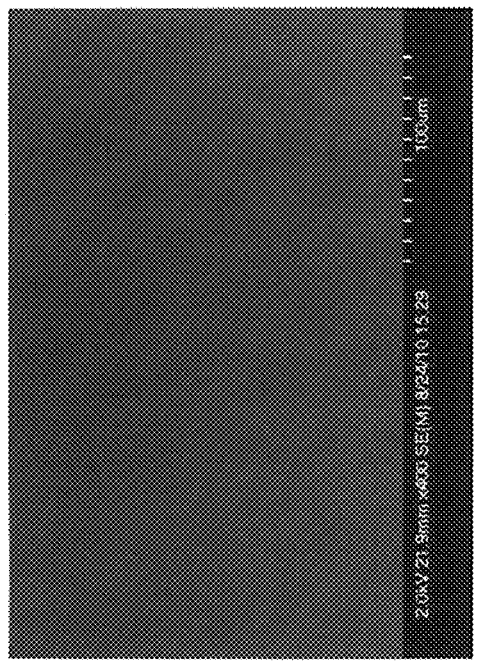
FIG. 21 is a scanning electron micrograph (SEM) photo of outer surface of tomato skin: (A) fresh control; (B) IR treated tomato; (C) Lye treated tomato; (D) Steam treated tomato skin.
Figure 21B:
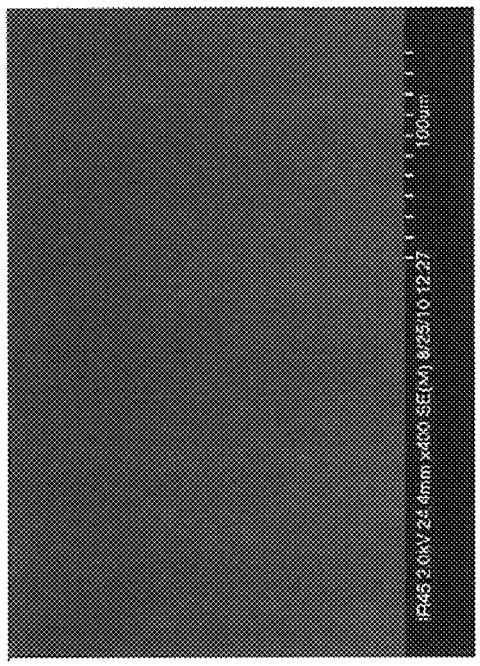
Figure 21C:
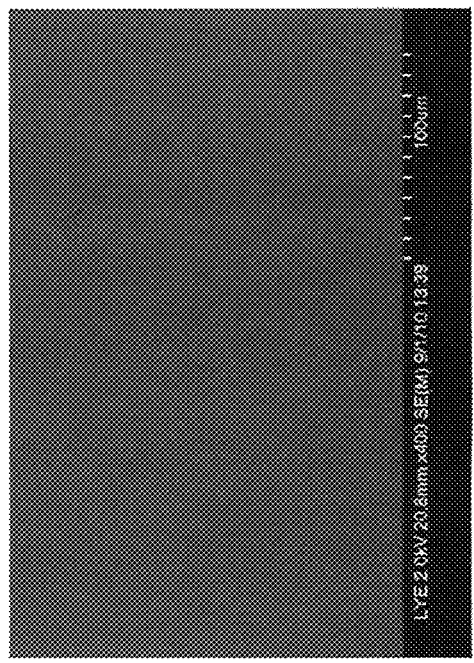
Figure 21D:
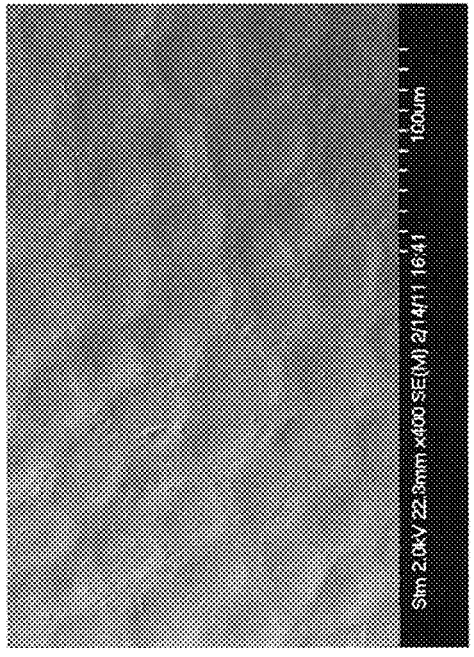
Figure 22A:
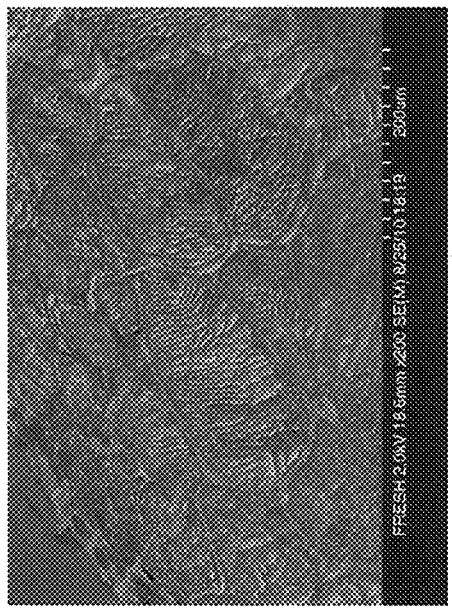
FIG. 22 is a SEM photo of cross-sectional views of tomato dermal system: (A) fresh control; (B) IR treated tomato; (C) Lye treated tomato; (D) Steam treated tomato skin.
Figure 22B:
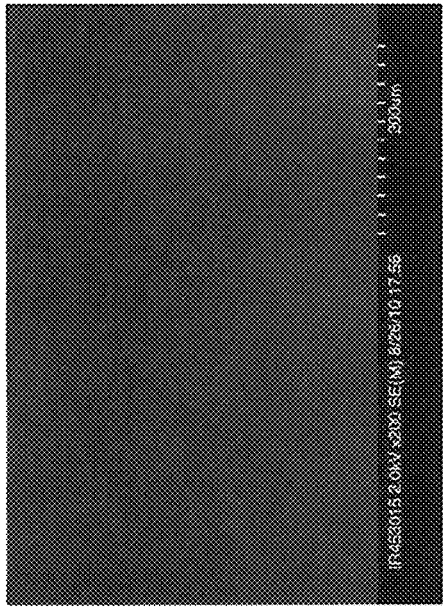
Figure 22C:
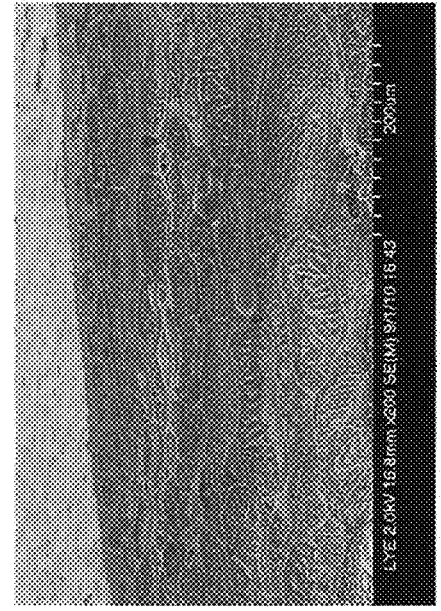
Figure 22D:
Figure 23A:
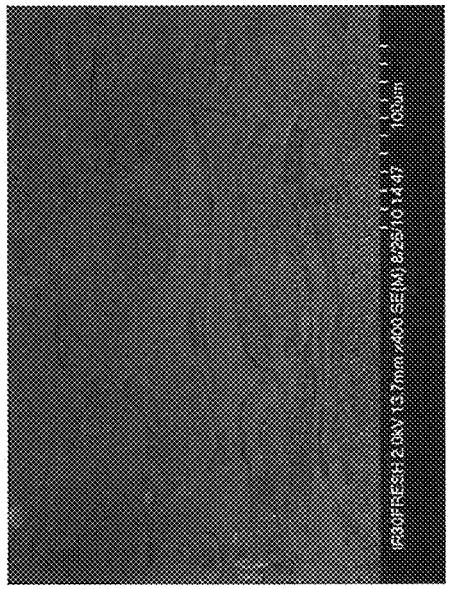
FIG. 23 is a SEM photo of cross-sectional views of tomato exocarp tissue: (A) fresh control; (B) IR treated tomato; (C) Lye treated tomato; (D) Steam treated tomato skin.
Figure 23B:
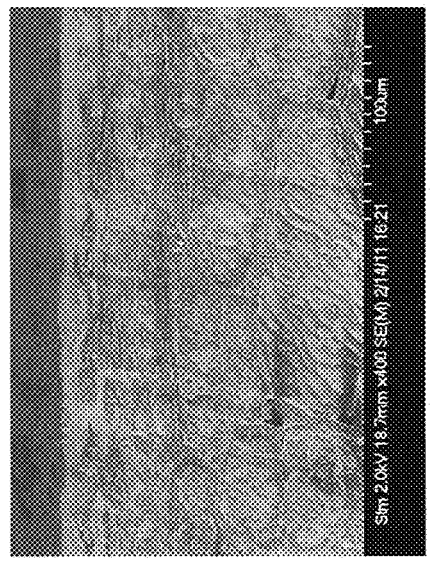
Figure 23C:
Figure 23D:
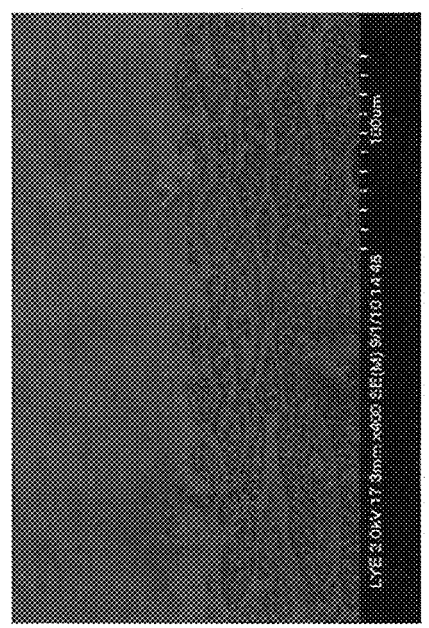
Figure 24B:
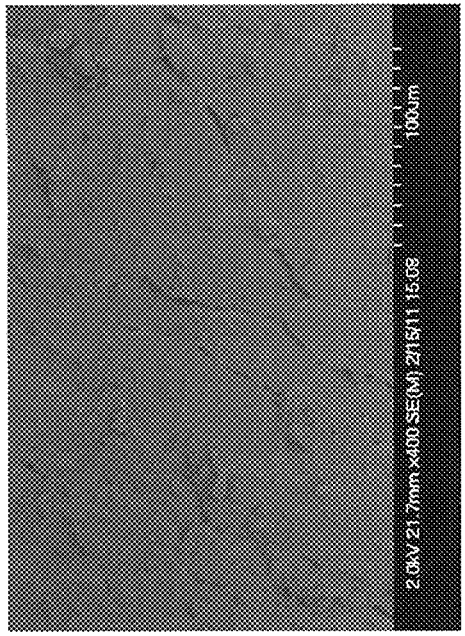
FIG. 24 is a SEM photo of the outer surface of pear skin: (A) fresh control; (B) IR heating; (C) lye treatment.
Figure 24A:
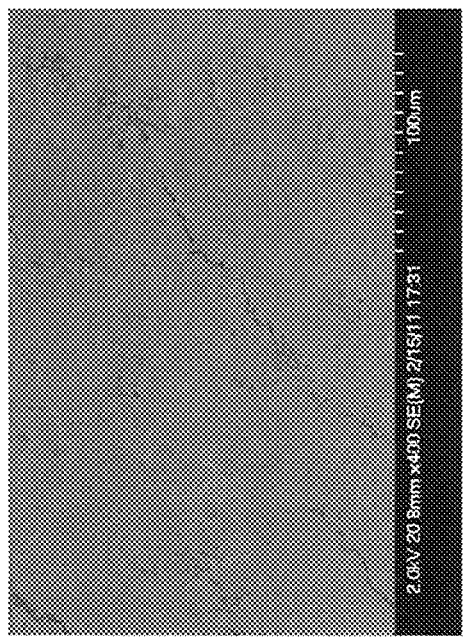
Figure 24C:
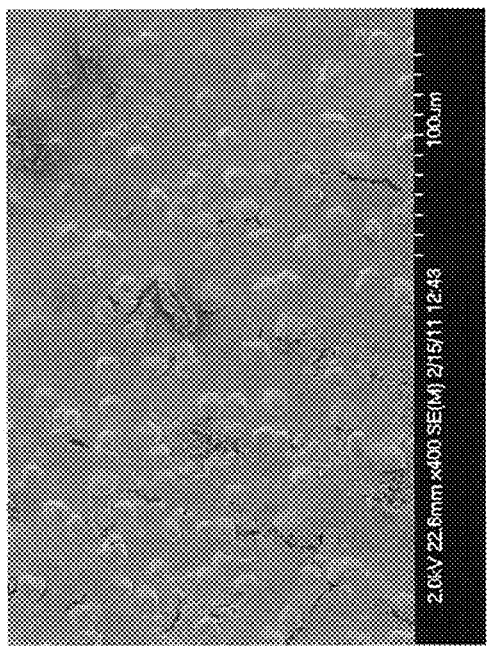
Figure 25A:
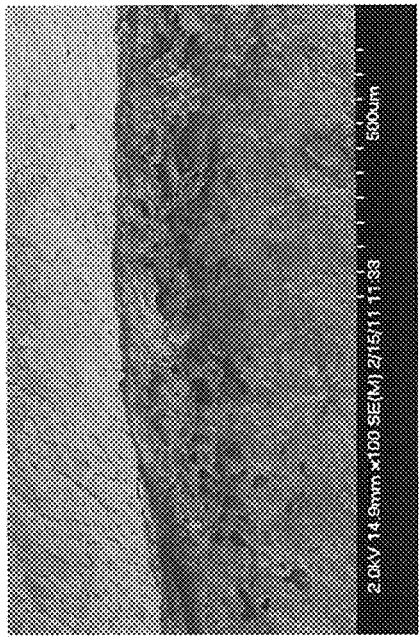
FIG. 25 is a SEM photo of cross section of pear pericarp: (A) fresh control; (B) IR heating; (C) lye treatment; (D) knife-cut.
Figure 25B:
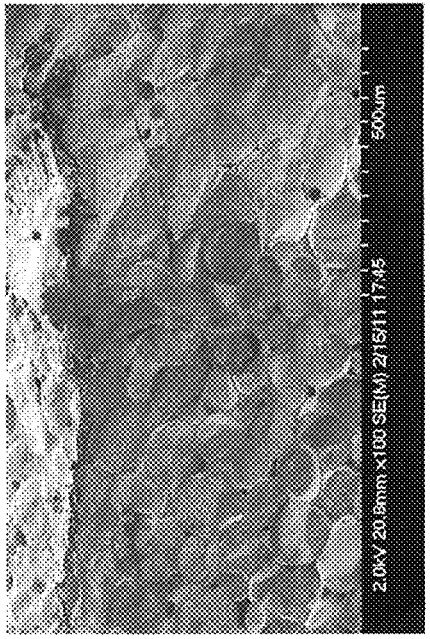
Figure 25C:
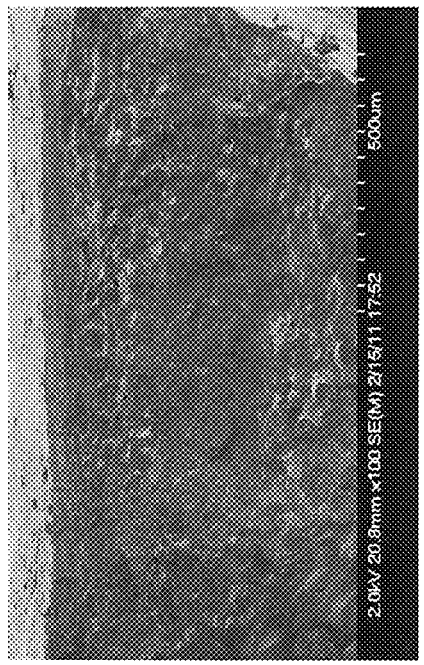
Figure 25D:
Figure 26A:
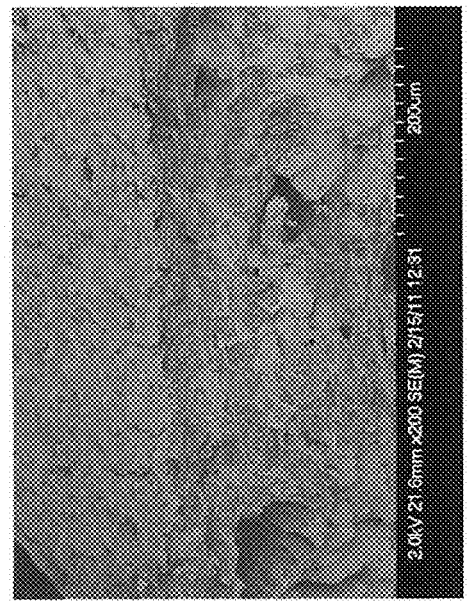
FIG. 26 is a SEM photo of pear cells: (A) fresh control; (B) IR heating; (C) lye treatment; (D) knife-cut.
Figure 26B:
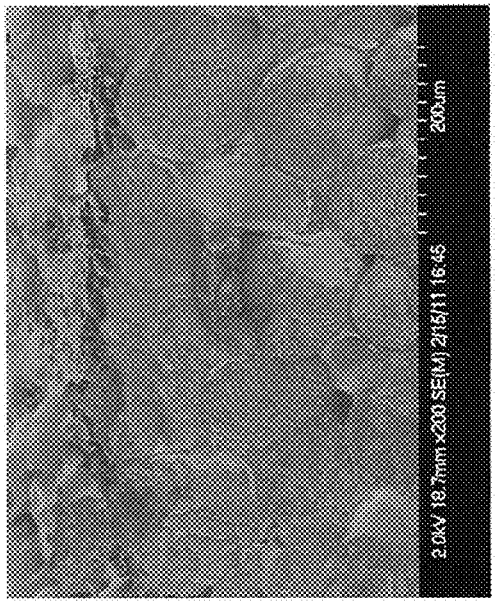
Figure 26C:
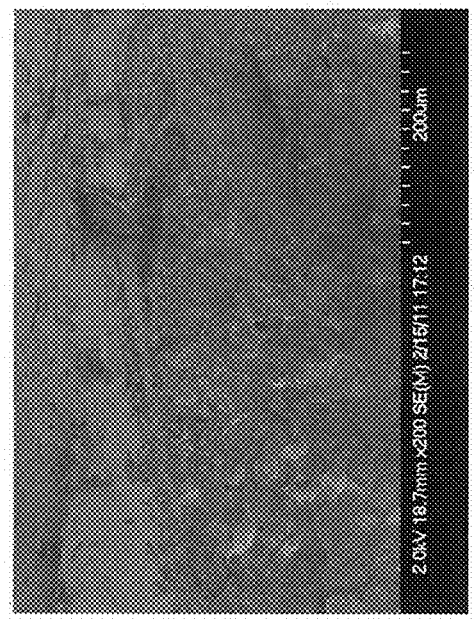
Figure 26D:
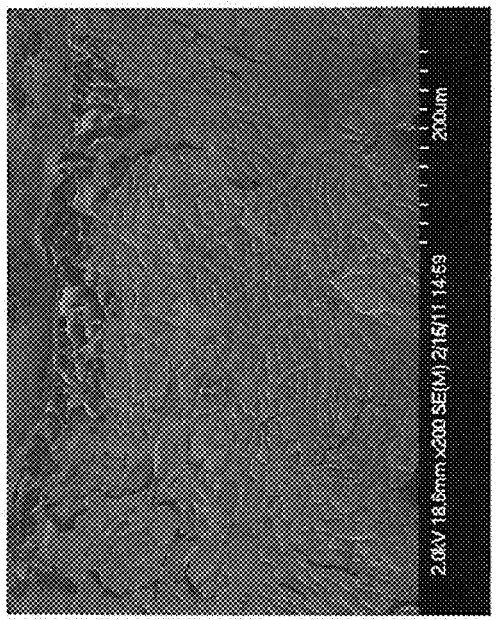

As time of IR heating increases the amount of pear peel remaining decreases. The pear peel completely glided off at both 60 seconds as seen in FIG. 18 A, and 45 seconds as seen in FIG. 18B. In both cases peel separated from the fruit in large pieces as seen in FIG. 19. The peel only needed an initial tear in the peel made by hand scrubbing and with a swipe of the thumb was easily removed. At 30 seconds the peel was removed easily but clung to the stem and root of the pear (FIG. 20). The heating of 30 seconds lead to fragmented peel pieces.

FIG. 20 B contains images of Bartlett pears depicting 25 seconds of IR treatment. The majority of the peel was removed with the most peel cling occurring at the stem, root and on any scars present on the pear. Peel was removed in fragmented pieces in most cases and did need slightly more pressure to remove compared to 60/45 seconds of heating.

IR Heating of 15 seconds yielded many small fragmented pieces of skin and slightly more pressure (firmness) than 25 seconds of IR treatment in scrubbing to remove the peel. There was a significant area of peel remaining compared to alternative IR times, however, there was still a considerable portion of peel removed. These results are seen in the images listed in FIG. 20 C. This shows promise for future infrared heating peeling designs, which may be able to distribute heat more uniformly.

Cooking Rings

After peel removal pears were sliced in half length-wise in order to measure the cooking ring. The cooking ring was measured at the shoulder of the pear. It was noted that the cooking ring appeared even throughout the length of the pear regardless of the diameter of the pear when excessive heating was used. Surprising cooking rings were not obviously apparent for infrared heating times of 30 seconds or less. Cooking rings were most apparent at 60 seconds. In general cooking ring thickness diminished as IR heating time decreased.

An optimum time of between 15 and 25 seconds of heating produced high quality products and could be significantly reduced with the design of a more efficient infrared system. Surprisingly pear peel could be completely removed with infrared heating application followed by gentle mechanical application to solve any issues of minor peel cling or scar formation.

Sensory Evaluation

The sensory evaluation comparing diced pears peeled with caustic versus infrared peeled pears in extra light syrup was conducted by 5 trained panelists. On a 5 point scale, appearance was rated acceptable (3 points) for caustic peeled pears compared to typical (4 points) for infrared peeled pears. Texture was rated less acceptable for caustic peeled pears compared to infrared peeled pears. Taste and the overall finished product was rated comparable between caustic peeled pears and infrared peeled pears.

Example 4

Comparison of Tomato Peel Micro-Structure Changes after IR, Steam and Lye Peeling by Using Cryo-Scanning Electron Microscopy Tomato Outer Surface Changes On fresh tomato surface, extracelluar cuticle covers the outer surface of tomato skin as a continuous waxy membrane. From the SEM images, it can be seen that clearly defined contours of cell wall structures exists on fresh tomato surface (FIG. 21 A). The steam peeling yielded a similar appearance (FIG. 21 D). After lye treatment, the contours and overall shape of epidermal cells became more readily visible and also raised surfaces in the center of each cell appear differently from the concave surface on the cells of fresh tomatoes (FIG. 21 C). In contrast to lye treated tomato, the skin treated by IR showed that distinct cell contours disappeared and a knoblike protuberance arising from each cell surface (FIG. 21 B). These knoblike protuberances are unique to IR peeled fruits and vegetables.

Tomato Tissue and Microstructure Changes

A cross-sectional SEM images of the outer pericarp tissues for the fresh, IR-, lye- and steam-treated tomatoes are presented in FIG. 22. The tomato dermal system, or called as exocarp, comprises cuticle, single tabular form epidermis layer plus two to four layer of thick-walled hypodermal cells. Beneath the exocarp tissue, the cell structures become larger with a form of round shape, which were known as parenchymatous cells and represented the edible flesh portion of tomato fruits. By comparing FIG. 22 A and FIG. 22 B, thermal expansion of cell wall and separation of cytoplasm from cell membrane can be obviously found in FIG. 22 B. These anatomical features indicated that IR thermal treatment had dramatically disrupted the microstructure of tomato tissues right beneath the skin. Cell wall expansion was only observed in IR treated tomatoes, not in lye and steam treated tomatoes (FIGS. 22 C and 22 D), however, cytoplasm separation and enlarged intercellular space can be found in lye treated tomatoes which could be due to the degradation of pectin layer in the middle lamella dissolved by lye solution. Cell wall thermal expansion in steam treated tissues was found insignificantly due to the inefficient heat delivery and transfer capability of steam as compared to IR.

Tomato Pericarp Cells Changes

A higher magnification SEM images in FIG. 23 C revealed that control and lye treated tomato tissues had crystal structures in their cytoplasm and thicken cell walls. No crystal structures were found for IR treated samples in FIG. 23 B. Different from IR and lye treated tissues in FIG. 23 D, cytoplasm in steam treated samples showed more solid content which result from the steam water diffusion. Steam water can breakdown the cell structure according to conduction heat transfer coupled with the diffusive mass transfer.

Example 5

Comparison of Pear Peel Micro-Structure Changes after IR, Knife-Cut and Lye Peeling by Using Cryo-Scanning Electron Microscopy Pear Outer Surface Changes Appearance of the outer surface of pear skins was dramatically changed after IR and lye peeling. In contrast to fresh control with smooth surface with little cracks, visible bubbles appeared on the pear skins heated by IR. It is suspect that the occurrence of such bubbles results from the phenomena of evaporation and diffusion of water vapor from the tissue beneath the skin to the outer surface impacted by the IR irradiative heating. More cracks but fewer bubbles were found on the skin treated by the hot lye solution. These cracks damaged due to the high concentration and high temperature of lye solution would facilitate lye penetration during peeling process, which cause the peel being dissolved faster and more completely.

Cross-Sectional View of Microstructure Changes of Pear Tissue

Different mechanisms responsible for different peel-removal methods were clearly shown and compared to fresh pear tissues in FIG. 25. Absence of thin epidermal cell layers was found in pear samples treated by knife-cut peeling and hot lye peeling. In the FIG. 25 D of knife-cut samples, small and tabulated epidermal cells did not exist and large and round shaped pericarp cells remained with little deformation. This is true because rupture force of knife-cut occurred only at the pear skin with a thickness of about 1 mm while the cells apart from that layer have less mechanical damage and appears intact. As a comparison, completely disrupted cells with unclearly defined cell walls were observed in lye peeled pear samples. Skins with the outer part of the pear tissues were gradually dissolved into the hot lye solution, which cause the disappearance of pear skin and epidermal cells in FIG. 25 C. KOH chemical reactions with pear tissue cause the breakdown of cell walls and disorder of cell structures. Depending on the diffusion and reaction rate, the degree of cell destruction may vary and affect the peeling performance and peeled product quality. Complete skin and pericarp tissues were reserved in IR treated samples, in which cell structural integrity can explain the findings of improved peeled product quality and less peeling loss of IR dry-peeling. Feasibility of using IR heat for fruit peeling was reflected as layer separations in the SEM images. As shown in FIG. 25 B, the presence of pores beneath the skin resulted from the thermal introduced degradation of pectins within middle lamella and disruption of cell walls.

Pear Pericarp Cells Changes

Closer views of cell structural change due to different treatments were shown in FIG. 26. Thermal expanse of cell walls and enlargement of inter cellular space can be clear seen in IR treated samples (FIG. 26 B). Disordered cells and lost structures after lye peeling were obvious in contrast to the well defined cell wall and organized cell alignment of fresh pear. As seen in FIGS. 26 A and 26 D, smaller cells closed to skin can be observed in fresh samples but were absent after knife-cut. Therefore, undesired removal of tissues attached to the skin can explain a larger peeling loss rate due to mechanical peeling method.

We claim:

1. A method for peeling fruits or vegetables comprising (i) exposing the fruit or vegetable to heat from at least one concave infrared emitter or plurality thereof (ii) wherein the distance between the fruit surface and the emitter surface is between 5-40 mm (iii) and the surface temperature of the fruits and vegetables during and after IR heating is 70-100° C. for a time sufficient to promote peeling and a tissue ratio of intercellular/intracellular area ranging from about 25% to 33%.

2. The method of claim 1 wherein the emitter is ceramic.

3. The method of claim 2, wherein the ceramic emitter consists of an array or z configuration.

4. The method of claim 1 wherein the fruit or vegetable is exposed to the emitter while rotating the fruit.

5. The method of claim 1 wherein the fruit or vegetable is selected from the group consisting of pear, peach, apricot, apple, grape, cherries, tomato, bananas, potato, eggplant, tomato, cucumber, zucchini, oranges, lemons, grapefruit.

6. The method of claim 1 wherein the emitter surface temperature is in the range of 200-850° C.

7. The method of claim 1 wherein the fruit or vegetable passes through multiple emitter zones of same or varied temperatures.

* * * * *